(12) United States Patent
Kitani et al.

(10) Patent No.: US 7,817,637 B2
(45) Date of Patent: Oct. 19, 2010

(54) NETWORK SWITCHING SYSTEM

(75) Inventors: Makoto Kitani, Yokohama (JP); Takahisa Miyamoto, Yokohama (JP); Keiichiro Yamate, Hadano (JP)

(73) Assignee: Alaxala Networks Corporation, Kanagawa (JP)

( * ) Notice: Subject to any disclaimer, the term of this patent is extended or adjusted under 35 U.S.C. 154(b) by 76 days.

(21) Appl. No.: 12/179,603

(22) Filed: Jul. 25, 2008

(65) Prior Publication Data
US 2009/0154461 A1    Jun. 18, 2009

(30) Foreign Application Priority Data
Dec. 14, 2007   (JP)   ............... 2007-323429

(51) Int. Cl.
*H04L 12/28* (2006.01)
*H04L 12/56* (2006.01)

(52) U.S. Cl. .................................................. 370/392

(58) Field of Classification Search ............... 370/392, 370/390, 395, 386, 216, 217, 219, 256, 242, 370/252, 250, 248, 393, 419, 498, 542, 535; 379/265, 93; 709/223, 217, 219, 250, 240, 709/225, 239; 340/3, 825; 375/240; 712/220; 726/1, 12
See application file for complete search history.

(56) References Cited

U.S. PATENT DOCUMENTS 6,636,512 B1 * 10/2003 Lorrain et al. ............. 370/392
6,735,299 B2 * 5/2004 Krimstock et al. ......... 379/265.11
6,853,623 B2 * 2/2005 Nederveen et al. ........ 370/250
7,480,258 B1 * 1/2009 Shuen et al. ............... 370/256
2003/0086554 A1 * 5/2003 Krimstock et al. ........ 379/265.02
2008/0275975 A1 * 11/2008 Pandey et al. ............. 709/223

FOREIGN PATENT DOCUMENTS

JP       2002-217935       8/2002

* cited by examiner

*Primary Examiner*—Pankaj Kumar
*Assistant Examiner*—Prenell P Jones
(74) *Attorney, Agent, or Firm*—Antonelli, Terry, Stout & Kraus, LLP.

(57) ABSTRACT

A handling address range is pre-assigned to each of switching devices consisting a network switching system. The switching device has a data receiving unit, an assigned data transport unit, an unassigned data transport unit, and a lower transport layer transport unit. The data receiving unit receives data including a destination address in a network layer and a destination identifier in a lower transport layer. If the destination identifier specifies the device itself, the assigned data transport unit and the unassigned data transport unit perform data transfer, whereas if the destination identifier specifies a device other than itself, the lower transport layer transport unit performs data transport. When the destination address is assigned address, the assigned data transport unit generates data including an identifier of a device corresponding to the destination address, and transports the generated data. When the destination address is not assigned address, the unassigned data transport unit transport the data to a switching device among the plurality of switching devices consisting the switching system to which the destination address is assigned.

18 Claims, 22 Drawing Sheets

Fig.4

MANAGEMENT NETWORK

| IP_NMT | 192.168.1.0/28 |
|---|---|
| IP_M1 | 192.168.1.2 |
| IP_M2 | 192.168.1.3 |
| IP_M3 | 192.168.1.4 |
| IP_M4 | 192.168.1.1 |

INTERNAL TRANSPORT NETWORK

| IP_INT1 | 192.168.1.16/30 |
|---|---|
| IP_I1 | 192.168.1.17 |
| IP_I2 | 192.168.1.18 |
| IP_INT2 | 192.168.1.20/30 |
| IP_I3 | 192.168.1.21 |
| IP_I4 | 192.168.1.22 |
| IP_INT3 | 192.168.1.24/30 |
| IP_I5 | 192.168.1.25 |
| IP_I6 | 192.168.1.26 |

EXTERNAL COMMUNICATION NETWORK

| IP_ONT1 | 20.1.1.0/30 |
|---|---|
| IP_O1 | 20.1.1.1 |
| IP_R1 | 20.1.1.2 |
| IP_ONT2 | 80.0.0.0/30 |
| IP_O2 | 80.0.0.1 |
| IP_R2 | 80.0.0.2 |
| IP_ONT3 | 150.0.1.0/30 |
| IP_O3 | 150.0.1.1 |
| IP_R3 | 150.0.1.2 |
| IP_ONT4 | 50.1.1.0/30 |
| IP_O4 | 50.1.1.1 |
| IP_R4 | 50.1.1.2 |

Fig.6

RESULTS OF LEARNING ARP INFORMATION IN INDIVIDUAL NETWORK SWITCHING DEVICES

FIRST SWITCHING DEVICE

| IP ADDRESS | MAC ADDRESS | LEARNING PORT |
|---|---|---|
| 20.1.1.2(IP_R1) | MAC_R1 | 20.1.1.1(IP_O1) |
| 192.168.1.1(IP_M4) | MAC_M4 | 192.168.1.2(IP_M1) |
| 192.168.1.18(IP_I2) | MAC_I2 | 192.168.1.17(IP_I1) |
| 192.168.1.26(IP_I6) | MAC_I6 | 1.92168.1.25(IP_I5) |

SECOND SWITCHING DEVICE

| IP ADDRESS | MAC ADDRESS | LEARNING PORT |
|---|---|---|
| 80.0.0.2(IP_R2) | MAC_R2 | 80.0.0.1(IP_O2) |
| 192.168.1.1(IP_M4) | MAC_M4 | 192.168.1.3(IP_M2) |
| 192.168.1.17(IP_I1) | MAC_I1 | 192.168.1.18(IP_I2) |
| 192.168.1.22(IP_I4) | MAC_I4 | 1.92168.1.21(IP_I3) |

THIRD SWITCHING DEVICE

| IP ADDRESS | MAC ADDRESS | LEARNING PORT |
|---|---|---|
| 150.0.1.2(IP_R3) | MAC_R3 | 150.0.1.1(IP_O3) |
| 50.1.1.2(IP_R4) | MAC_R4 | 50.1.1.1(IP_O4) |
| 192.168.1.1(IP_M4) | MAC_M4 | 192.168.1.4(IP_M3) |
| 192.168.1.21(IP_I3) | MAC_I3 | 192.168.1.22(IP_I4) |
| 192.168.1.25(IP_I5) | MAC_I5 | 192.168.1.26(IP_I6) |

Fig.7

| IP ADDRESS | MAC ADDRESS | DELIVERY PORT | LEARNING SOURCE DEVICE |
|---|---|---|---|
| 20.1.1.2(IP_R1) | MAC_R1 | 20.1.1.1(IP_O1) | FIRST SWITCHING DEVICE |
| 50.1.1.2(IP_R4) | MAC_R4 | 50.1.1.1(IP_O4) | THIRD SWITCHING DEVICE |
| 80.0.0.2(IP_R2) | MAC_R2 | 80.0.0.1(IP_O2) | SECOND SWITCHING DEVICE |
| 150.0.1.2(IP_R3) | MAC_R3 | 150.0.1.1(IP_O3) | THIRD SWITCHING DEVICE |
| 192.168.1.1(IP_M4) | MAC_M4 | 192.168.1.2(IP_M1) | FIRST SWITCHING DEVICE |
|  |  | 192.168.1.3(IP_M2) | SECOND SWITCHING DEVICE |
|  |  | 192.168.1.4(IP_M3) | THIRD SWITCHING DEVICE |
| 192.168.1.17(IP_I1) | MAC_I1 | 192.168.1.16(IP_I2) | SECOND SWITCHING DEVICE |
| 192.168.1.18(IP_I2) | MAC_I2 | 192.168.1.17(IP_I1) | FIRST SWITCHING DEVICE |
| 192.168.1.21(IP_I3) | MAC_I3 | 192.168.1.22(IP_I4) | THIRD SWITCHING DEVICE |
| 192.168.1.22(IP_I4) | MAC_I4 | 1.92168.1.21(IP_I3) | SECOND SWITCHING DEVICE |
| 192.168.1.25(IP_I5) | MAC_I5 | 192.168.1.26(IP_I6) | THIRD SWITCHING DEVICE |
| 192.168.1.26(IP_I6) | MAC_I6 | 1.92168.1.25(IP_I5) | FIRST SWITCHING DEVICE |

260

SO (rows 1–4), SI (rows 5–11)

Fig.8

STATIC ARP INFORMATION SET UP IN FIRST
SWITCHING DEVICE

| IP ADDRESS | MAC ADDRESS | DELIVERY PORT |
|---|---|---|
| 50.1.1.2(IP_R4) | MAC_R4 | 192.168.1.25(IP_I5) |
| 80.0.0.2(IP_R2) | MAC_R2 | 192.168.1.17(IP_I1) |
| 150.0.1.2(IP_R3) | MAC_R3 | 192.168.1.25(IP_I5) |

STATIC ARP INFORMATION SET UP IN SECOND
SWITCHING DEVICE

| IP ADDRESS | MAC ADDRESS | DELIVERY PORT |
|---|---|---|
| 20.1.1.2(IP_R1) | MAC_R1 | 192.168.1.18(IP_I2) |
| 50.1.1.2(IP_R4) | MAC_R4 | 192.168.1.21(IP_I3) |
| 150.0.1.2(IP_R3) | MAC_R3 | 192.168.1.21(IP_I3) |

STATIC ARP INFORMATION SET UP IN THIRD
SWITCHING DEVICE

| IP ADDRESS | MAC ADDRESS | DELIVERY PORT |
|---|---|---|
| 20.1.1.2(IP_R1) | MAC_R1 | 192.168.1.26(IP_I6) |
| 80.0.0.2(IP_R2) | MAC_R2 | 192.1681.22(IP_I4) |

| IP ADDRESS | MAC ADDRESS | DELIVERY PORT | TYPE |
|---|---|---|---|
| 20.1.1.2(IP_R1) | MAC_R1 | 20.1.1.1(IP_O1) | DYNAMICALLY LEARNED |
| 50.1.1.2(IP_R4) | MAC_R4 | 192.168.1.25(IP_I5) | STATICALLY SET |
| 80.0.0.2(IP_R2) | MAC_R2 | 192.168.1.17(IP_I1) | STATICALLY SET |
| 150.0.1.2(IP_R3) | MAC_R3 | 192.168.1.25(IP_I5) | STATICALLY SET |
| 192.168.1.1(IP_M4) | MAC_M4 | 192.168.1.2(IP_M1) | DYNAMICALLY LEARNED |
| 192.168.1.18(IP_I2) | MAC_I2 | 192.168.1.17(IP_I1) | DYNAMICALLY LEARNED |
| 192.168.1.26(IP_I6) | MAC_I6 | 1.92168.1.25(IP_I5) | DYNAMICALLY LEARNED |

136b

| IP ADDRESS | MAC ADDRESS | DELIVERY PORT | TYPE |
|---|---|---|---|
| 20.1.1.2(IP_R1) | MAC_R1 | 192.168.1.18(IP_I2) | STATICALLY SET |
| 50.1.1.2(IP_R4) | MAC_R4 | 192.168.1.21(IP_I3) | STATICALLY SET |
| 80.0.0.2(IP_R2) | MAC_R2 | 80.0.0.1(IP_O2) | DYNAMICALLY LEARNED |
| 150.0.1.2(IP_R3) | MAC_R3 | 192.168.1.21(IP_I3) | STATICALLY SET |
| 192.168.1.1(IP_M4) | MAC_M4 | 192.168.1.3(IP_M2) | DYNAMICALLY LEARNED |
| 192.168.1.17(IP_I1) | MAC_I1 | 192.168.1.16(IP_I2) | DYNAMICALLY LEARNED |
| 192.168.1.22(IP_I4) | MAC_I4 | 1.92168.1.21(IP_I3) | DYNAMICALLY LEARNED |

136c

| IP ADDRESS | MAC ADDRESS | DELIVERY PORT | TYPE |
|---|---|---|---|
| 20.1.1.2(IP_R1) | MAC_R1 | 192.168.1.26(IP_I6) | STATICALLY SET |
| 50.1.1.2(IP_R4) | MAC_R4 | 50.1.1.1(IP_O4) | DYNAMICALLY LEARNED |
| 80.0.0.2(IP_R2) | MAC_R2 | 192.1681.22(IP_I4) | STATICALLY SET |
| 150.0.1.2(IP_R3) | MAC_R3 | 150.0.1.1(IP_O3) | DYNAMICALLY LEARNED |
| 192.168.1.1(IP_M4) | MAC_M4 | 192.168.1.4(IP_M3) | DYNAMICALLY LEARNED |
| 192.168.1.21(IP_I3) | MAC_I3 | 192.168.1.22(IP_I4) | DYNAMICALLY LEARNED |
| 192.168.1.25(IP_I5) | MAC_I5 | 192.168.1.26(IP_I6) | DYNAMICALLY LEARNED |

Fig.11

| | ROUTING INFORMATION | MASK LENGTH | TRANSMISSION SOURCE SWITCHING DEVICE |
|---|---|---|---|
| ROUTING INFORMATION BROADCAST TO EXTERNAL ROUTERS | 20.1.1.0 | 30 | FIRST SWITCHING DEVICE |
| | 20.1.1.1 | 32 | FIRST SWITCHING DEVICE |
| | 50.1.1.0 | 30 | THIRD SWITCHING DEVICE |
| | 50.1.1.1 | 32 | THIRD SWITCHING DEVICE |
| | 80.0.0.0 | 30 | SECOND SWITCHING DEVICE |
| | 80.0.0.1 | 32 | SECOND SWITCHING DEVICE |
| | 150.0.1.0 | 30 | THIRD SWITCHING DEVICE |
| | 150.0.1.1 | 32 | THIRD SWITCHING DEVICE |
| ROUTING INFORMATION NOT BROADCAST | 192.168.1.0 | 28 | FIRST THROUGH THIRD SWITCHING DEVICE |
| | 192.168.1.2 | 32 | FIRST SWITCHING DEVICE |
| | 192.168.1.3 | 32 | SECOND SWITCHING DEVICE |
| | 192.168.1.4 | 32 | THIRD SWITCHING DEVICE |
| | 192.168.1.16 | 30 | FIRST AND SECOND SWITCHING DEVICE |
| | 192.168.1.17 | 32 | FIRST SWITCHING DEVICE |
| | 192.168.1.18 | 32 | SECOND SWITCHING DEVICE |
| | 192.168.1.20 | 30 | SECOND AND THIRD SWITCHING DEVICE |
| | 192.168.1.21 | 32 | SECOND SWITCHING DEVICE |
| | 192.168.1.22 | 32 | THIRD SWITCHING DEVICE |
| | 192.168.1.24 | 30 | FIRST AND THIRD SWITCHING DEVICE |
| | 192.168.1.25 | 32 | FIRST SWITCHING DEVICE |
| | 192.168.1.26 | 32 | THIRD SWITCHING DEVICE |

Fig.12

ROUTING INFORMATION BROADCAST
BY EXTERNAL ROUTERS

EXTERNAL ROUTER500a

| ROUTING INFORMATION | MASK LENGTH |
|---|---|
| 20.1.0.0 | 16 |
| 20.1.1.2 | 32 |
| 70.0.0.0 | 24 |
| 100.100.100.0 | 24 |

EXTERNAL ROUTER500b

| ROUTING INFORMATION | MASK LENGTH |
|---|---|
| 50.0.0.0 | 8 |
| 80.0.0.0 | 24 |
| 80.0.0.2 | 32 |
| 190.1.0.0 | 16 |

EXTERNAL ROUTER500c

| ROUTING INFORMATION | MASK LENGTH |
|---|---|
| 63.1.0.0 | 16 |
| 64.1.0.0 | 16 |
| 64.2.0.0 | 16 |
| 65.0.0.0 | 24 |
| 130.1.1.0 | 28 |
| 150.0.1.0 | 30 |
| 150.0.1.2 | 32 |

EXTERNAL ROUTER500d

| ROUTING INFORMATION | MASK LENGTH |
|---|---|
| 50.1.1.0 | 30 |
| 50.1.1.2 | 32 |
| 110.0.0.0 | 24 |

Fig.13

| | ROUTING INFORMATION | MASK LENGTH | TRANSMISSION SOURCE SWITCHING DEVICE |
|---|---|---|---|
| 0/2 (0.0.0.0~ 63.255.255.255) | 20.1.0.0 | 16 | EXTERNAL ROUTER500a |
| | 20.1.1.0 | 30 | FIRST SWITCHING DEVICE、 EXTERNAL ROUTER500a |
| | 20.1.1.1 | 32 | FIRST SWITCHING DEVICE |
| | 20.1.1.2 | 32 | EXTERNAL ROUTER500a |
| | 50.0.0.0 | 8 | EXTERNAL ROUTER500b |
| | 50.1.1.0 | 30 | THIRD SWITCHING DEVICE、 EXTERNAL ROUTER500d |
| | 50.1.1.1 | 32 | THIRD SWITCHING DEVICE |
| | 50.1.1.2 | 32 | EXTERNAL ROUTER500d |
| | 63.1.0.0 | 16 | EXTERNAL ROUTER500c |
| 64/2 (64.0.0.0~ 127.255.255.255) | 64.1.0.0 | 16 | EXTERNAL ROUTER500c |
| | 64.2.0.0 | 16 | EXTERNAL ROUTER500c |
| | 65.0.0.0 | 24 | EXTERNAL ROUTER500c |
| | 70.0.0.0 | 24 | EXTERNAL ROUTER500a |
| | 80.0.0.0 | 24 | EXTERNAL ROUTER500b |
| | 80.0.0.0 | 30 | SECOND SWITCHING DEVICE |
| | 80.0.0.1 | 32 | SECOND SWITCHING DEVICE |
| | 80.0.0.2 | 32 | EXTERNAL ROUTER500b |
| | 100.100.100.0 | 24 | EXTERNAL ROUTER500a |
| | 110.0.0.0 | 24 | EXTERNAL ROUTER500d |
| 128/1 (128.0.0.0~ 255.255.255.255) | 130.1.1.0 | 28 | EXTERNAL ROUTER500c |
| | 150.0.1.0 | 30 | THIRD SWITCHING DEVICE、 EXTERNAL ROUTER500c |
| | 150.0.1.1 | 32 | THIRD SWITCHING DEVICE |
| | 150.0.1.2 | 32 | EXTERNAL ROUTER500c |
| | 190.1.0.0 | 16 | EXTERNAL ROUTER500b |

| ROUTING INFORMATION | MASK LENGTH | TRANSPORT DESTINATION DEVICE IP ADDRESS |
|---|---|---|
| 20.1.0.0 | 16 | 20.1.1.2(IP_R1) |
| 20.1.1.0 | 30 | -(LOCAL) |
| 20.1.1.1 | 32 | -(LOCAL) |
| 20.1.1.2 | 32 | 20.1.1.2(IP_R1) |
| 50.0.0.0 | 8 | 80.0.0.2(IP_R2) |
| 50.1.1.0 | 30 | 192.168.1.26(IP_I6) |
| 50.1.1.1 | 32 | 192.168.1.26(IP_I6) |
| 50.1.1.2 | 32 | 50.1.1.2(IP_R4) |
| 63.1.0.0 | 16 | 150.0.1.2(IP_R3) |
| 64.0.0.0 | 2 | 192.168.1.18(IP_I2) |
| 128.0.0.0 | 1 | 192.168.1.26(IP_I6) |

ASSIGNED ADDRESSES: rows 20.1.0.0 through 63.1.0.0
UNASSIGNED ADDRESSES: rows 64.0.0.0 and 128.0.0.0

135b

| ROUTING INFORMATION | MASK LENGTH | TRANSPORT DESTINATION DEVICE IP ADDRESS |
|---|---|---|
| 64.1.0.0 | 16 | 150.0.1.2(IP_R3) |
| 64.2.0.0 | 16 | 150.0.1.2(IP_R3) |
| 65.0.0.0 | 24 | 150.0.1.2(IP_R3) |
| 70.0.0.0 | 24 | 20.1.1.2(IP_R1) |
| 80.0.0.0 | 24 | 80.0.0.2(IP_R2) |
| 80.0.0.0 | 30 | -(LOCAL) |
| 80.0.0.1 | 32 | -(LOCAL) |
| 80.0.0.2 | 32 | 80.0.0.2(IP_R2) |
| 100.100.100.0 | 24 | 20.1.1.2(IP_R1) |
| 110.0.0.0 | 24 | 50.1.1.2(IP_R4) |
| 0.0.0.0 | 2 | 192.168.1.17(IP_I1) |
| 128.0.0.0 | 1 | 192.168.1.22(IP_I4) |

ASSIGNED ADDRESSES: rows 64.1.0.0 through 110.0.0.0
UNASSIGNED ADDRESSES: rows 0.0.0.0 and 128.0.0.0

135c

| ROUTING INFORMATION | MASK LENGTH | TRANSPORT DESTINATION DEVICE IP ADDRESS |
|---|---|---|
| 130.1.1.0 | 28 | 150.0.1.2(IP_R3) |
| 150.0.1.0 | 30 | -(LOCAL) |
| 150.0.1.1 | 32 | -(LOCAL) |
| 150.0.1.2 | 32 | 150.0.1.2(IP_R3) |
| 190.1.0.0 | 16 | 80.0.0.2(IP_R2) |
| 0.0.0.0 | 2 | 192.168.1.25(IP_I5) |
| 64.0.0.0 | 2 | 192.168.1.21(IP_I3) |

ASSIGNED ADDRESSES: rows 130.1.1.0 through 190.1.0.0
UNASSIGNED ADDRESSES: rows 0.0.0.0 and 64.0.0.0

NETWORK SWITCHING SYSTEM

CROSS-REFERENCE TO RELATED APPLICATIONS

The present application claims the priority based on Japanese Patent Application No. 2007-323429 filed on Dec. 14, 2007, the disclosure of which is hereby incorporated herein by reference in its entirety.

BACKGROUND OF THE INVENTION

1. Field of the Invention

The present invention relates a network switching system, controlling method of a network switching system, and a managing device of a network switching system.

2. Description of the Related Art

JP2002-217935A disclose a technique connecting a plurality of so-called Layer 2 switches, which transport data based on data link layer addresses such as MAC addresses, so as to operate virtually as a single Layer 2 switch.

However, it is not yet established a technique connecting a plurality of network switching devices (e.g. Layer 3 switches or routers), which switch data on the basis of network layer addresses such as IP addresses, so as to operate virtually as a single network switching device in an efficient manner.

SUMMARY

An object of the present invention is to provide a technique to connect a plurality of network switching devices, which switch data on the basis of network layer addresses, and to operate as a single network switching device in an efficient manner.

According to a first aspect of the present invention, there is provided a network switching system configured by connecting a plurality of network switching devices which operates virtually as a single network switching device. In the network switching system according to the first aspect, each of the plurality of network switching devices comprises: an address range storage that stores a handling address range pre-assigned as a range of network layer address, the switching device itself being responsible to associate between the network layer address within the handling address range and a target transport destination device; a data receiving unit that receives lower transport layer data including: a destination network layer address which represents a network layer address specifying a destination in the network layer; and a destination lower transport layer identifier which is a lower transport layer identifier specifying a destination in a lower transport layer below the network layer; an assigned data transport unit that, if received data received by the data receiving unit is the lower transport layer data including the destination lower transport layer identifier specifying the switching device itself and if the destination network layer address is an assigned address assigned to the switching device itself, generates lower transport layer data including a corresponding identifier as the lower transport layer identifier of the target transport destination device corresponding to the destination network layer address, and transports the generated lower transport layer data on the basis of the corresponding identifier; an unassigned data transport unit that, if the received data includes the destination lower transport layer identifier specifying the switching device itself and if the destination network layer address is an unassigned address not assigned to the switching device itself, transports the lower transport layer data to another switching device among the plurality of network switching devices to which the unassigned address is assigned, while setting the lower transport layer identifier of the another switching device to the destination lower transport layer identifier; and a lower transport layer transport unit that, if the received data includes the destination lower transport layer identifier specifying a device different from the switching device itself, transports the received data on the basis of the destination lower transport layer identifier.

With the network switching system according to the first aspect, individual network switching devices forwards received data as needed based on the destination network layer address, and in the network switching device to which the destination network layer address is assigned, lower transport layer data including a corresponding identifier, which is the lower transport layer identifier of the target destination device associated with the destination network layer address, is generated. In layers below the network layer, the lower transport layer data so generated is forwarded on the basis of the corresponding identifier. Typically, in layers below the network layer, the destination is directly identified by the lower transport layer identifier. For this reason, during transport of data in a network switching system, it is sufficient for each individual network switching device to keep information representing associations between a network layer addresses and target destination devices exclusively for the assigned address to be assigned to itself. Consequently, a memory resource belonging to individual network switching devices may be utilized efficiently throughout the network switching system as a whole, and more routing information may be kept in the network switching system as a whole.

The network switching system according to the first aspect may be configured so that the lower transport layer transport unit is adapted to carry out transport of the lower transport layer data using the data link layer or an intermediate layer between the data link layer and the network layer as the lower transport layer, the data receiving unit receives lower transport layer data including at least one of a destination data link layer address representing a destination in the data link layer and a destination intermediate layer identifier representing a destination in the intermediate layer as the destination transport layer identifier, if the target transport destination device is a transport destination for data in the intermediate layer, the assigned data transport unit generates as the lower transport layer data intermediate layer data including the destination intermediate layer identifier as the corresponding identifier, if the target transport destination device is not a transport destination for data in the intermediate layer, the assigned data transport unit generates as the lower transport layer data link layer data including the destination data link layer address as the corresponding identifier, the lower transport layer transport unit has: an intermediate layer transport unit that, if the received data includes the destination intermediate layer identifier, transports the received data on the basis of the destination intermediate layer identifier; and a data link layer transport unit that, if the received data does not include the destination intermediate layer identifier, transports the received data on the basis of the destination data link layer address, and if the destination lower transport layer identifier is the intermediate layer identifier, the intermediate layer transport unit generates lower transport layer data not including the intermediate layer identifier.

With this arrangement, lower transport layer data may be transported either through the data link layer as the lower transport layer, or through an intermediate layer between the data link layer and the network layer as the lower transport layer. Where the target destination device is a destination in the intermediate layer, intermediate layer data in which the intermediate layer identifier is the destination lower transport layer identifier may be forwarded by way of the lower transport layer data. On the other hand, where the target destination device is not a destination in the intermediate layer, data link layer data in which the data link layer identifier is the destination lower transport layer identifier may be forwarded by way of the lower transport layer data. Thus, depending on the type of lower transport layer accepted by a target destination device, either data link layer data or intermediate layer data is forwarded to the target destination device. Moreover, if the destination lower transport layer identifier is an intermediate layer identifier, by generating lower transport layer data not including the intermediate layer identifier, the intermediate layer transport unit is able to forward data transported through the intermediate layer to a device whose lower transport layer is the data link layer. For this reason, data may be forwarded appropriately with reference to the type of data accepted by target destination devices connected via the network switching devices.

The network switching system according to the first aspect may be configured so that the intermediate layer is a label transport layer for transporting the intermediate layer data using a label as the destination intermediate layer identifier, the label being established on the basis of a transport route to the target transport destination device, and each of the plurality of network switching devices has label transport layer information associating an adjacent transport destination device situated adjacently to the switching device itself as the transport destination of the received data and a label established in the intermediate layer data to be transported to the adjacent transport destination device with an adjacent transport source device situated adjacently to the switching device itself as the transport source of the received data and the label of the received data, and the intermediate layer transport unit swaps the label of the intermediate layer data by looking up the label transport layer information, and transports the label-swapped intermediate layer data to the adjacent transport destination device.

With this arrangement, it is possible to control transport of data using labels to target destination devices compatible with data transport in the label transport layer. Typically, in label transport, data transport routing may be controlled using labels. Thus, data transport routing from the network switching system to a target destination device may be set more appropriately.

The network switching system according to the first aspect may be configured so that the intermediate layer is a tunnel layer that sets up a virtual port virtually connected to the target transport destination device to transport the intermediate layer data via the virtual port, each of the plurality of network switching devices has tunnel layer information associating a destination tunnel layer address as the intermediate layer identifier of the target transport destination device in the intermediate layer with the virtual port, the destination tunnel layer address being handled as a network layer address between the virtual port and the target transport destination device, the intermediate layer transport unit looks up the tunnel layer information, if the destination tunnel layer address is associated with the virtual port set up in the switching device itself, the intermediate layer transport unit transports the intermediate layer data to the target transport destination device, and if the destination tunnel layer address is associated with the virtual port set up in the device other than itself, the intermediate layer transport unit transporting the intermediate layer data to a device other than itself.

With this arrangement, it is possible to transport data through the tunnel layer to the target destination device compatible with data transport in the tunnel layer. Typically, data transport in the tunnel layer may take place to any target destination device so long as capable of data transport via a virtual port. For this reason, connections between the network switching system and target destination devices may be established in a more flexible manner.

According to a second aspect of the present invention, there is provided a network switching system configured by connecting a plurality of network switching devices which operates virtually as a single network switching device. In the network switching system according to the second aspect, each of the plurality of network switching devices comprises: a plurality of ports in order to connect to an external device or to a device other than itself among the plurality of network switching devices; a data link layer information storage that stores data link layer information associating a data link layer address of a transport destination device with a first corresponding port among the plurality of ports, the transport destination devices including: the device other than itself, a first external device from among the external devices connected via a port of the switching device itself; and a second external device from among the external devices connected via a port of the device other than itself; a network layer information storage that stores first network layer information associating a network layer address with the transport destination device, the transport destination device associated with an assigned address among network layer addresses assigned to the switching device itself including the first external device or the second external device, the transport destination device associated with an unassigned address not assigned to the switching device itself being the device other than itself to which the unassigned address is assigned; a label transport layer information storage that stores label transport layer information associating a label established on the basis of the transport route to the transport destination device with a second corresponding port among the plurality of ports, the label being provided in a label transport layer for the first external device and the device other than itself, a receiving unit that receives data via any of the plurality of ports, the received data including: at least one of a destination data link layer address as an address in the data link layer and a first destination label as a label of the label transport layer; and a destination network layer address as an address in the network layer; a network layer transport unit that, if the destination data link layer address is the data link layer address of the switching device itself and if the transport destination device associated with the destination data link layer address is not a destination device reliant on the label transport layer, changes the destination data link layer address to the data link layer address of the transport destination device associated with the destination network layer address and transports the received data from the first corresponding port associated with the changed destination data link layer address by using the data link layer information and the first network layer information; a label transport layer ingress transport unit that, if the destination data link layer address is the data link layer address of the switching device itself and if the transport destination device associated with the destination data link layer address is a destination reliant in the label transport layer, appends as the first destination label a label of the transport destination device associated with the destination network layer address by using the first network layer information, and transports the received data from the second corresponding port associated with the first destination label by using the label transport layer information; a data link layer transport unit that, if the destination data link layer address is the data link layer address of the transport destination device, transports the received data from the first corresponding port associated with the destination data link layer address by using the data link layer information; a label transport layer intermediate transport unit that, if the first destination label is a label of the label transport layer corresponding to the transport destination device, changes the label of the received data to the second destination label associated with the first destination label and transports the received data from the second corresponding port associated with the second destination label by using the label transport layer information; and a label transport layer egress transport unit that, if the first destination label is a label specifying removal of the label, removes the label from the received data, and changes the destination data link layer address to a data link layer address of the transport destination device associated with the destination network layer address and transports the received data from the first corresponding port associated with the changed destination data link layer address by using the first network layer information.

With the network switching system according to the second aspect of the present invention, it is sufficient for each individual network switching device to keep information that describes associations with external devices exclusively for the assigned address assigned to itself. Thus memory resources belonging to individual network switching devices may be utilized efficiently throughout the network switching system as a whole. In addition, by carrying out transport using the label transport layer, data transport routes may be controlled using labels. Thus, the data transport route from the network switching system to a destination external device may be set more appropriately.

According to a third aspect of the present invention, there is provided a network switching system configured by connecting a plurality of network switching devices which operates virtually as a single network switching device. In the network switching system according to the third aspect, each of the plurality of network switching devices comprises: a plurality of ports in order to connect to an external device or to a device other than itself among the plurality of network switching devices; a data link layer information storage that stores data link layer information associating a data link layer address of a transport destination device with a corresponding port among the plurality of ports, the transport destination devices including: the device other than itself; a first external device from among the external devices connected via a port of the switching device itself, and a second external device from among the external devices connected via a port of the device other than itself; a network layer information storage that stores first network layer information associating a network layer address with the transport destination device, the transport destination device associated with an assigned address among network layer address assigned to the switching device itself including the first external device or the second external device, the transport destination device associated with an unassigned address not assigned to the switching device itself being the device other than itself to which the unassigned address is assigned; a tunnel layer information storage that stores tunnel layer information associating with a virtual port provided independently from the plurality of ports a destination tunnel layer address which indicates the tunnel layer address of a tunnel destination external device connected via the virtual port and a transmission source tunnel layer address which is the tunnel layer address of a device of itself or devices other than itself having the virtual port, the tunnel layer addresses being handled as network layer addresses between the virtual port and the tunnel destination external device; a receiving unit that receives data via any of the plurality of ports, the received data including: at least one of a destination data link layer address as an address in the data link layer and a destination tunnel layer address; and a destination network layer address as an address in the network layer; a network layer transport unit that, if the destination data link layer address is the data link layer address of the switching device itself and if the transport destination device associated with the destination data link layer address is not a destination device which routes through the virtual port, changes the destination data link layer address to the data link layer address of the transport destination device associated with the destination network layer address and transports the received data from the corresponding port associated with the changed destination data link layer address by using the data link layer information and the first network layer information; a tunnel transport layer ingress transport unit that, if the destination data link layer address is the data link layer address of the switching device itself and if the transport destination device associated with the destination data link layer address is the tunnel destination external device, appends: the destination tunnel layer address associated with the virtual port; and the transmission source tunnel layer address to the received data by using the first network layer information and the tunnel layer information, and transports the received data from the corresponding port associated with the destination tunnel layer address by using the first network layer information in which the destination tunnel layer address is designated as the destination network layer address; a data link layer transport unit that, if the data link layer address is the data link layer address of the transport destination device, transports the received data from the first corresponding port associated with the destination data link layer address by using the data link layer information; and a tunnel layer egress transport unit that, if the destination network layer address is the tunnel layer address of the device itself, removes the destination tunnel layer address and the transmission source tunnel layer address from the received data, and changes the destination data link layer address to the data link layer address of the transport destination device associated with the destination network layer address and transports the received data from the corresponding port associated with the changed destination data link layer address by using the first network layer information.

With the network switching system according to the third aspect of the present invention, it is sufficient for each individual network switching device to keep information that describes associations with external devices exclusively for the assigned address assigned to itself. Thus, memory resources belonging to individual network switching devices may be utilized efficiently throughout the network switching system as a whole. In addition, by carrying out transport using the tunnel transport layer, data may be forwarded to any external device capable of data transport via a virtual port, and thus switching may be carried out in a more flexible manner in the network switching system.

According to a fourth aspect of the present invention, there is provided a network switching system configured by connecting a plurality of network switching devices which operates virtually as a single network switching device. The network switching system according to the fourth aspect comprises: a plurality of ports; a data link layer information storage; a network layer information storage; a receiving unit; a network layer transport unit; a data link layer transport unit. The plurality of ports are provided in order to connect to an external device or to a device other than itself among the plurality of network switching devices. The data link layer information storage stores data link layer information associating a data link layer address of a transport destination device with a corresponding port among the plurality of ports. In the data link layer information, the transport destination devices including: the device other than itself; a first external device from among the external devices connected via a port of the switching device itself; and a second external device from among the external devices connected via a port of the device other than itself. The network layer information storage stores first network layer information associating a network layer address with the transport destination device. In the first network layer information, the transport destination device associated with an assigned address among network layer address assigned to the switching device itself includes the first external device or the second external device, the transport destination device associated with an unassigned address not assigned to the switching device itself is the device other than itself to which the unassigned address is assigned. The receiving unit receives data including: a destination data link layer address as an address in the data link layer; and a destination network layer address as an address in the network layer, via any of the plurality of ports. In the event that the destination data link layer address is the data link layer address of the switching device itself, the data link layer transport unit changes the destination data link layer address to the data link layer address of the transport destination device associated with the destination network layer address and transports the received data from the corresponding port associated with the changed destination data link layer address, by using the data link layer information and the first network layer information. In the event that the data link layer address is the data link layer address of the transport destination device, the network layer transport unit transports the received data from the corresponding port associated with the destination data link layer address by using the data link layer information.

With the network switching system according to the fourth aspect of the present invention, it is sufficient for each individual network switching device to keep information that describes associations with external devices exclusively for the assigned address assigned to itself. Thus memory resources belonging to individual network switching devices may be utilized efficiently throughout the network switching system as a whole. As a consequence, more routing information may be retained in the network switching system as a whole.

In the network switching system according to any of the second to fourth aspects of the present invention, each of the plurality of network switching devices may further comprise: a first learning unit that learns first partial information representing a part of the data link layer information relating to the data link layer address of the transport destination device situated adjacent to the switching device itself, and the network switching system further may include: a first acquiring unit that acquires the first partial information from each of the plurality of network switching devices; and a first setup unit that sets up second partial information representing a part of the first partial information relating to data link layer addresses of transport destination devices not adjacent to the switching device itself, the information being set up in each of the plurality of network switching devices on the basis of the acquired first partial information. With this arrangement, it is possible to facilitate setting of the data link layer information to each of the network switching device.

The network switching system according to any of the second to fourth aspects of the present invention may be configure so that, in the event of a change in an adjacency relationship with the first external device occurring in any of the plurality of network switching devices, the first learning unit of the network switching device in which the change occurred re-learns the first partial information, the first acquiring unit re-acquires the first partial information from the network switching device in which the change occurred, and the first setup unit re-sets up the second partial information in each of the plurality of network switching devices. With this arrangement, data link layer information may be re-set automatically in response to a change in the adjacency relationship between an individual network switching device and an adjacent external device.

In the network switching system according to any of the second to fourth aspects of the present invention, each of the plurality of network switching devices may further include: second learning unit that learns routing information retained in the first external device from the first external device, and the network switching system may further comprise: second acquiring unit that acquires the routing information from each of the plurality of network switching devices; and second setup unit that sets up the first network layer information in each of the plurality of network switching devices on the basis of the acquired routing information. With this arrangement, it is possible to facilitate setting of the first network link layer information to each of the network switching device.

In the network switching system according to any of the second to fourth aspects of the present invention, the second setup unit may have: a first creation unit that generates second network layer information associating network layer addresses with the first external device or the second external device on the basis of the acquired routing information; a division unit that divides the network layer addresses into address ranges equal in number to the plurality of network switching devices and designates the network layer addresses included in the respective address ranges as the respective assigned addresses of the plurality of network switching devices; and a second creation unit that generates first network layer information for respective setup in the plurality of network switching devices on the basis of the second network layer information and the results of the division. In this case, it is acceptable for the division unit to specify the address ranges in such a way that the first network layer information is generated according to the capacity of the respective second storage of the plurality of network switching devices. By creating the first network layer information according to the capacity of the respective second storage of the individual network switching devices in this way, it is possible to effectively utilize the second storage of the individual network switching device.

The network switching system according to any of the second to fourth aspects of the present invention may be configure so that, in the event of a change in an adjacency relationship with the first external device occurring in any of the plurality of network switching devices, the second learning unit of the network switching device in which the change occurred re-learns the routing information, the second acquiring unit re-acquire the routing information from the network switching device in which the change occurred, and the second setup unit re-sets up the first network layer information in each of the plurality of network switching devices. With this arrangement, network layer information may be re-set automatically in response to a change in the adjacency relationship between an individual network switching device and an adjacent external device.

The network switching system according to any of the second to fourth aspects of the present invention may further comprise a manager connected respectively to the plurality of network switching devices, wherein the manager may include the first acquiring unit and the first setup unit, or may include the second acquiring unit and the second setup unit. With this arrangement, data link layer information of individual network switching devices, or first network layer information, may be managed by the manager.

The present invention may be realized in various other ways, for example, a manager in a network switching system in which a plurality of network switching devices are connected and operate virtually as a single network switching device. In addition to these system and device, the invention may also be reduced to practice as a method invention, such as a method of controlling a network switching system in which a plurality of network switching devices respectively having a plurality of ports are connected and operate virtually as a single network switching device. Yet other realization may include, for example, a computer program for the purpose of building such a system, device, or method; a recording medium having such a computer program recorded thereon; or a data signal containing the computer program and carried on a carrier wave.

These and other objects, features, aspects, and advantages of the present invention will become more apparent from the following detailed description of the preferred embodiments with the accompanying drawings.

BRIEF DESCRIPTION OF THE DRAWINGS

FIG. 4 is a list of IP addresses assigned to various parts of the network switching system of the first embodiment;

FIG. 6 is an illustration showing ARP information learning results in individual network switching devices;

FIG. 7 is a schematic diagram showing a system ARP table;

FIG. 8 is an illustration showing static ARP information set up in individual network switching devices;

FIG. 9 is an illustration showing ARP tables set up in individual network switching devices;

FIG. 11 is an illustration showing routing information held by the network switching system;

FIG. 12 is an illustration showing routing information broadcast by individual external routers;

FIG. 13 is a schematic diagram showing a system routing table;

FIG. 14 is an illustration showing routing tables set up in individual network switching devices;

DESCRIPTION OF THE PREFERRED EMBODIMENT

A. First Embodiment

Figure 1:
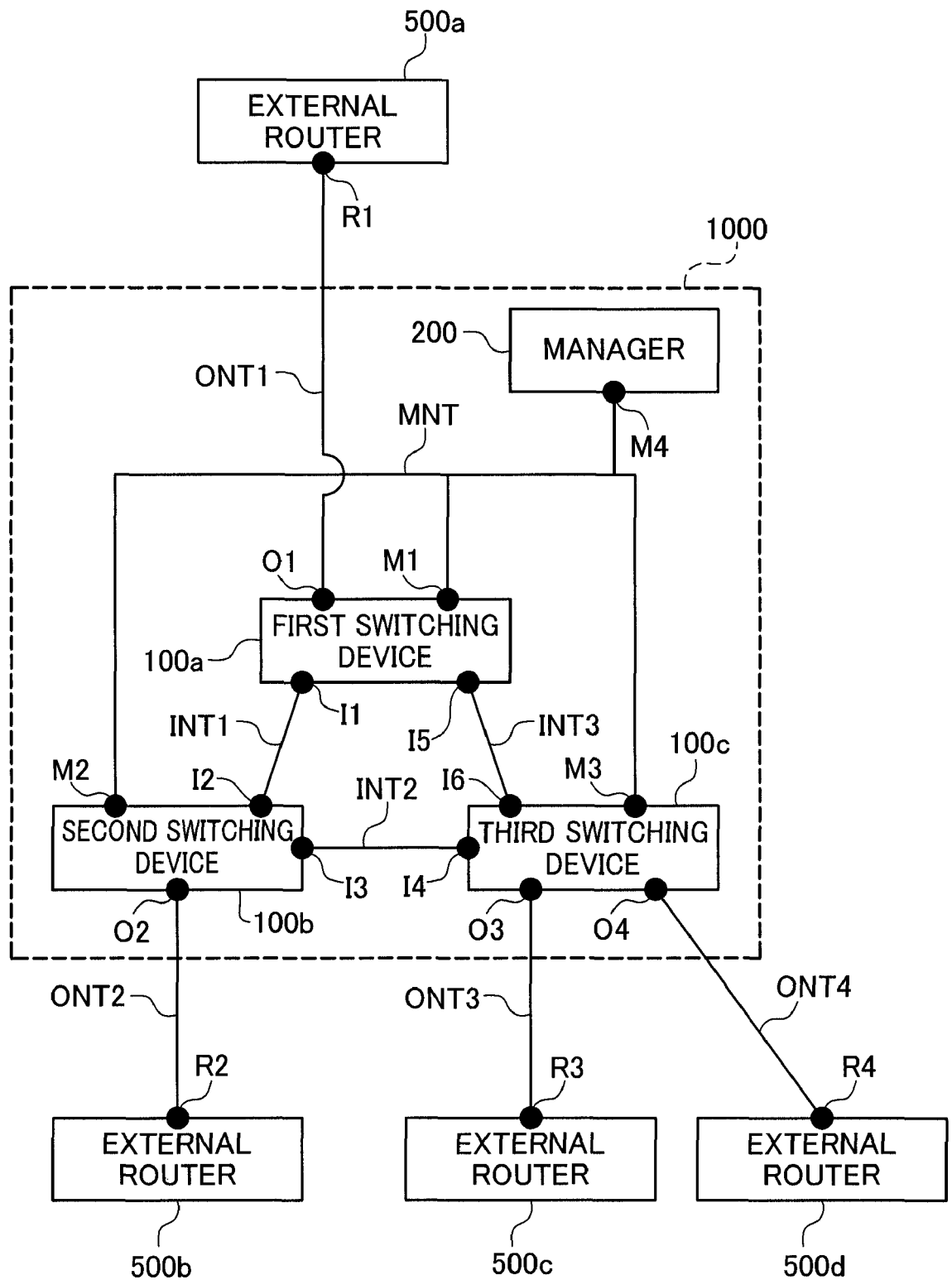
FIG. 1 is a block diagram depicting a simplified configuration of the network switching system according to the first embodiment.
Figure 2:
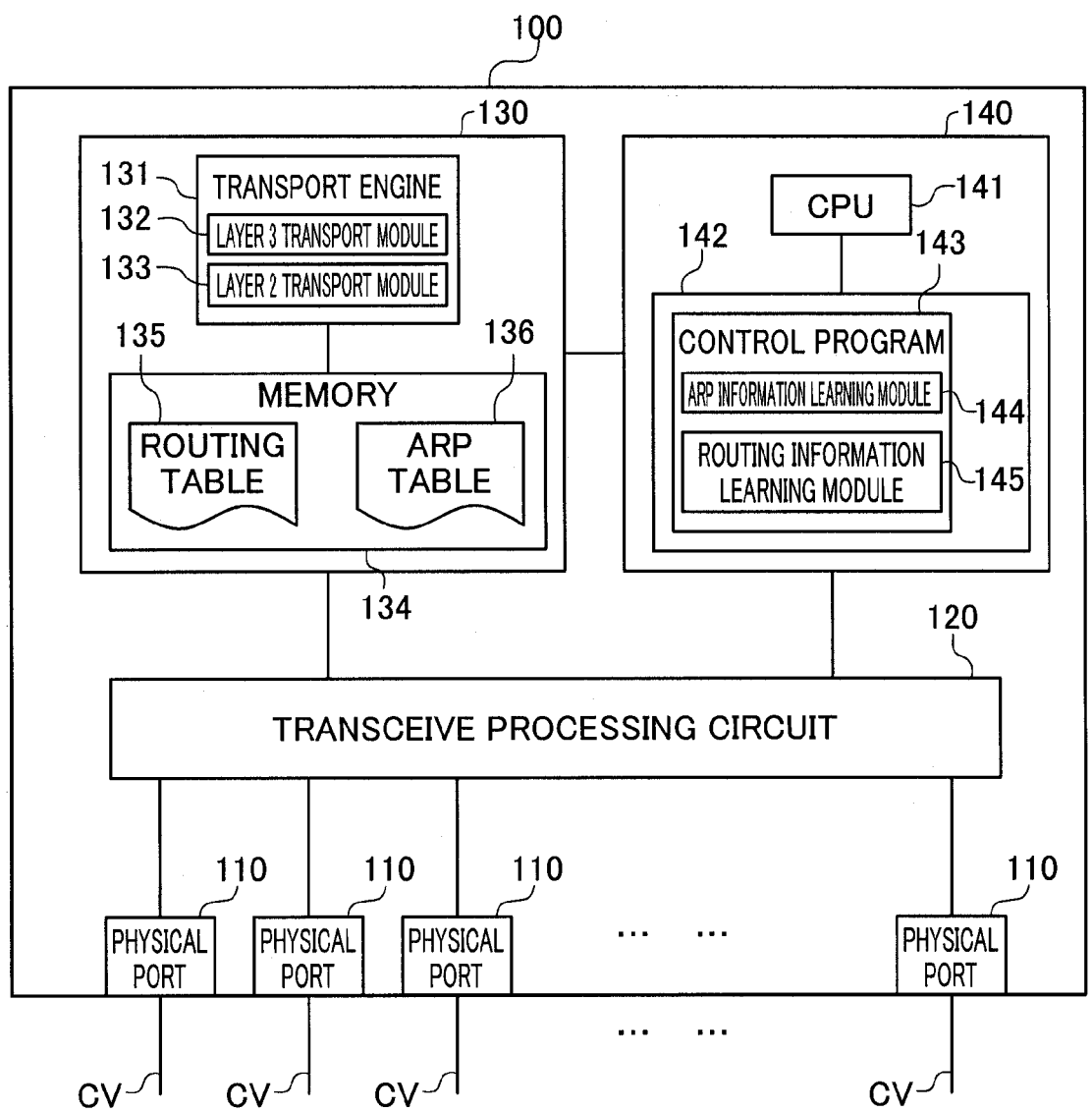
FIG. 2 is a block diagram depicting the internal configuration of a network switching device contained in the network switching system of the first embodiment.
Figure 3:
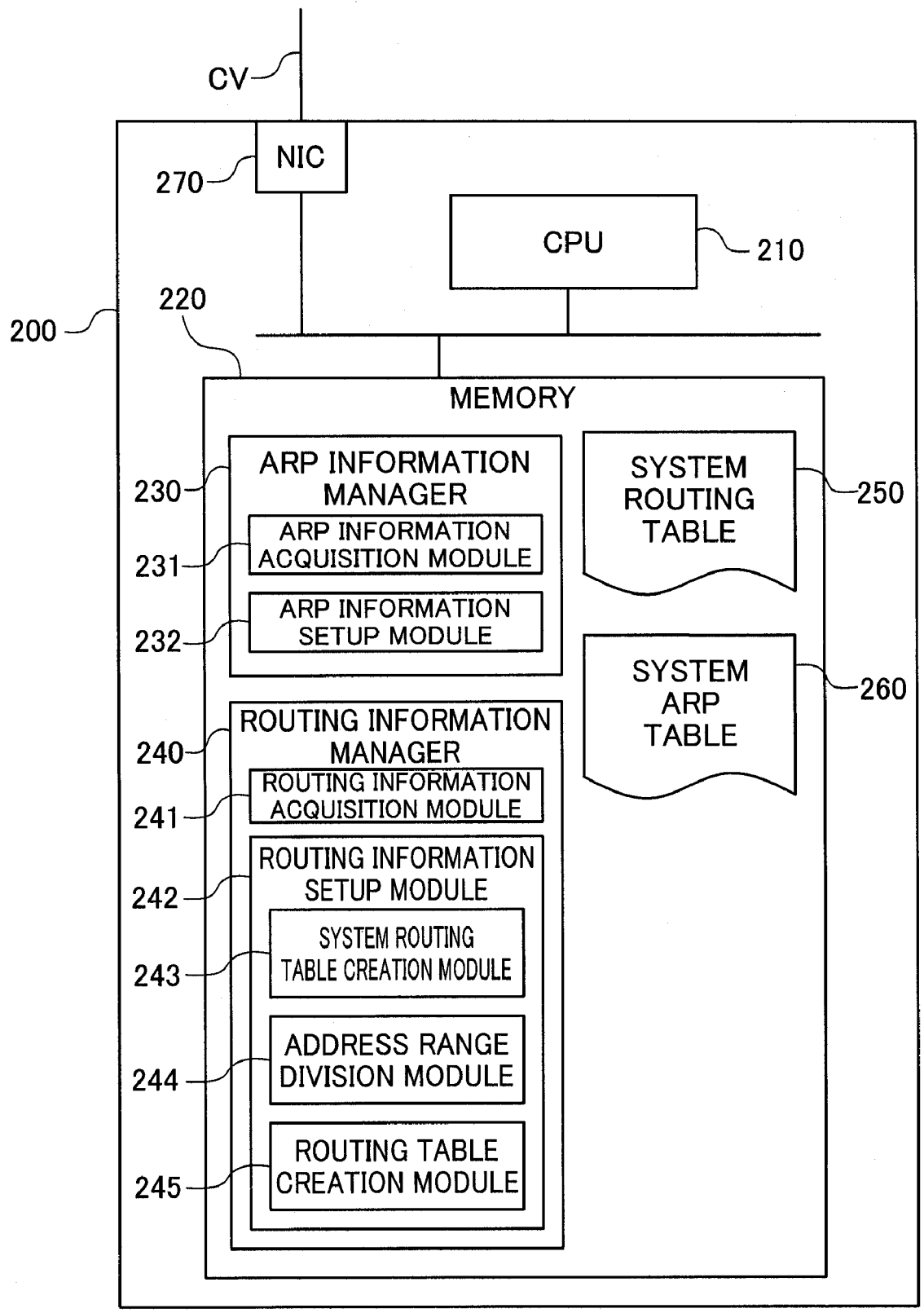
FIG. 3 is a block diagram depicting the internal configuration of a manager contained in the network switching system of the first embodiment.

Configuration of Network Switching System: Next, embodiments of the present invention will be described. The configuration of a network switching system according to the first embodiment will be described making reference to FIGS. 1 through 4. FIG. 1 is a block diagram depicting a simplified configuration of the network switching system according to the first embodiment. FIG. 2 is a block diagram depicting the internal configuration of a network switching device contained in the network switching system of the first embodiment. FIG. 3 is a block diagram depicting the internal configuration of a manager contained in the network switching system of the first embodiment. FIG. 4 is a list of IP addresses assigned to various parts of the network switching system of the first embodiment.

As shown in FIG. 1, the network switching system 1000 of the first embodiment includes three network switching devices, namely, a first switching device 100a, a second switching device 100b, and a third switching device 100c. Hereinafter, in instances where it is unnecessary to distinguish among these three individual network switching devices, the network switching devices will simply be identified by the symbol 100, omitting the letter suffix. The network switching system 1000 also includes a manager 200.

As shown in FIG. 2, the network switching device 100 includes a plurality of physical ports 110, a transceive processing circuit 120, a transport processing circuit 130, and a controller 140.

The physical ports 110 are the interfaces for connection to a network via a cable CV such as a coaxial cable or optic fiber. In the first embodiment, the physical ports 110 are ports compliant with the Ethernet (TM) standard.

The transceive processing circuit 120 is connected to the physical ports 110; it interprets an electrical signal received via a physical port 110 and performs a receiving process to convert the signal to a data cluster for use in the data link layer (hereinafter termed frames; in the first embodiment, these are Ethernet (TM) frames). The transceive processing circuit 120 also performs a transmitting process of receiving an Ethernet frame to be forwarded from the transport processing circuit 130, and converting the Ethernet frame to an electrical signal which is transmitted to a corresponding port, described later.

An Ethernet frame is composed of frame data with an attached MAC header containing a destination MAC address DM. The frame data include a data cluster for use in the network layer (hereinafter termed a packet; in the first embodiment, it is an IP packet). The IP packet is a packet with an attached IP header containing a destination IP address DI. That is, the Ethernet frame includes a packet, a destination IP address DI, and a destination MAC address DM. The transceive processing circuit 120 transmits the Ethernet frame to the transport processing circuit 130.

The transport processing circuit 130 includes a transport engine 131 and a memory 134. In the memory 134, a routing table 135 and an ARP table 136 are stored. The routing table 135 is a table which describes information that associates IP addresses with forwarding destination devices. The ARP table 136 is a table which describes information that associates forwarding destination device MAC addresses with corresponding ports. A corresponding port refers to one of the plurality of physical ports 110, specifically the port that is connected to the network to which the forwarding destination device is also connected. The routing table 135 and the ARP table 136 will be further discussed later. In the first embodiment, the information described in the routing table 135 is information that associates network layer addresses (IP addresses) with forwarding destination devices, and thus can also be termed "network layer information." The information described in the ARP table 136 is information that associates data link layer addresses (MAC addresses) with corresponding ports, and thus can also be termed "data link layer information." Accordingly, the memory 134 functions as both a network layer information storage unit for storing network layer information, and a data link layer storage unit for storing data link layer information.

The transport engine 131 is an ASIC (Application Specific Integrated Circuit) designed for the purpose of accomplishing the functions of the circuit, to be discussed later; the circuit functions discussed later are realized with the hardware. The transport engine 131 is a circuit for carrying out a transport process to forward Ethernet frames received from the transceive processing circuit 120. The transport engine 131 includes a Layer 3 transport module 132 and a Layer 2 transport module 133 as functional modules.

In the event that the destination MAC address DM contained in an Ethernet frame received from the transceive processing circuit 120 is a MAC address assigned to the physical port 110 which received the Ethernet frame, then the Layer 3 transport module 132 identifies the forwarding destination device for forwarding of the IP packet contained in the Ethernet frame on the basis of the destination IP address DI contained in the Ethernet frame. As will be described later, this identification of the forwarding destination device is carried out through lookup of the routing table 135 stored in the memory 134. The Layer 3 transport module 132 also identifies a MAC address of the identified forwarding destination device, and identifies the corresponding port for forwarding the Ethernet frame to the identified forwarding destination device. Identification of MAC address and corresponding port is carried out through lookup of the ARP table. The Layer 3 transport module 132 changes the destination MAC address DM contained in an Ethernet frame to a MAC address of the identified forwarding destination device, and then sends the modified Ethernet frame to the transceive processing circuit 120, specifying the identified corresponding port. As a result, the Ethernet frame is forwarded from the corresponding port to the forwarding destination device. Such transport with identification of the corresponding port by the Layer 3 transport module 132 in this manner is carried out based on IP address being the address in the network layer, which is layer 3 in the OSI (Open Systems Interconnection) model, accordingly the transport will be referred to as "Layer 3 transport" hereinafter.

In the event that the destination MAC address DM contained in an Ethernet frame received from the transceive processing circuit 120 is not a MAC address assigned to the physical port 110 which received the Ethernet frame, the Layer 2 transport module 133 looks up the ARP table 136 to determine whether the destination MAC address DM is a MAC address of the forwarding destination device. If the destination MAC address DM is a MAC address of the forwarding destination device, the Layer 2 transport module 133 looks up the ARP table 136 to identify a corresponding port for forwarding the Ethernet frame to the forwarding destination device in question. The Layer 2 transport module 133 then sends the Ethernet frame to the transceive processing circuit 120, specifying the identified corresponding port. As a result, the Ethernet frame is forwarded from the corresponding port to the forwarding destination device. Such transport with identification of the corresponding port by the Layer 2 transport module 133 in this manner is carried out based on MAC address being the address in the data link layer, which is layer 2 in the OSI (Open Systems Interconnection) model, accordingly the transport will be referred to as "Layer 2 transport" hereinafter.

As is apparent from the description above, the Layer 2 transport module 133 carries out data transport in the data link layer which is below the network layer (the lower transport layer). For this reason the Layer 2 transport module 133 can also be termed a "lower transport layer transport module." Also, since the MAC address is the identifier in the data link layer which represents a lower transport layer, it can also be called a "lower transport layer identifier," and the Ethernet frame can also be called "lower transport layer data."

The controller 140 controls the entire network switching device 100. The controller 140 is a computer of known type which includes a CPU (Central Processing Unit) 141 and a memory 142. A control program 143 is stored in the memory 142. The CPU 141 accomplishes the functions of the controller by executing the control program 143. The control program 143 includes a number of functional modules such as a function for carrying out a routing protocol process such as RIP (Routing Information Protocol) or OSPF (Open Shortest Path First), a function for communicating with the manager 200, and so on. However, in FIG. 2, only those arrangements needed to describe the first embodiment are shown selectively, and these illustrated arrangements will be described herein. The control program 143 includes an ARP information learning module 144 and a routing information learning module 145. The ARP information learning module 144 learns ARP information from devices located adjacently via physical ports 110 (e.g. an external router 500, discussed later, another network switching device 100, and the manager 200). The routing information learning module 145 learns routing information kept by the external router 500, from the external router 500 (discussed later) located adjacently via a physical port 110. The processes of the ARP information learning module 144 and the routing information learning module 145 will be discussed later.

The manager 200 is a computer that manages the entire network switching system 1000. As shown in FIG. 3, the manager 200 is a computer of known type, e.g. a PC (Personal Computer), and includes a CPU 210, memory 220 such as ROM and RAM, and a NIC (Network Interface Card) 270 for connection to the network. In the memory 220 are stored an ARP information manager 230 and a routing information manager 240 which represent programs for managing the entire network switching system 100; a system routing table 250; and a system ARP table 260. The CPU 210 carries out the functions of the manager through execution of the ARP information manager 230 and the routing information manager 240.

The ARP information manager 230 includes an ARP information acquisition module 231 and an ARP information setup module 232. The ARP information acquisition module 231 acquires ARP information from individual network switching devices 100 targeted for management, and generates the system ARP table 260. On the basis of the system ARP table 260, the ARP information setup module 232 statically sets up ARP information in the individual network switching devices 100. The routing information manager 240 includes a routing information acquisition module 241 and a routing information setup module 242. The routing information acquisition module 241 acquires routing information from individual network switching devices 100 targeted for management. On the basis of the acquired routing information, the routing information setup module 242 sets up routing tables for the individual network switching devices 100 targeted for management. The routing information setup module 242 includes a system routing table creation module 243, an address range division module 244, and a routing table creation module 245. On the basis of acquired routing information the system routing table creation module 243 generates a system routing table. The address range division module 244 divides the entire IP address range (0.0.0.0-255.255.255.255) into address ranges equal in number of the network switching devices 100 (three in the first embodiment), and allocates the individual divided address ranges as the assigned address ranges of the individual network switching devices 100. On the basis of the system ARP table 260 and the address ranges of the individual network switching devices 100, the routing table creation module 245 generates routing tables for setup in the individual network switching devices 100. The processes executed by the ARP information manager 230 and the routing information manager 240 will be further discussed later.

The discussion now continues returning to FIG. 1. In FIG. 1, the black circles denote ports of individual devices. For example, ports O1, M1, I1 and I5 of a network switching device 100 correspond to any of the physical ports 110 in FIG. 2; and the port M4 of the manager 200 corresponds to the port of the NIC 270 in FIG. 3.

As shown in FIG. 1, of the three network switching devices 100 included in the network switching system 1000, the port O1 of a first switching device 100a is connected via an external transport network ONT1 to a port R1 of an external router 500a. The port O2 of a second switching device 100b is connected via an external transport network ONT2 to a port R2 of an external router 500b. In similar fashion, ports O3 and O4 of a third switching device 100c are connected via external transport networks ONT3 and ONT4 to a port R3 of an external router 500c and a port R4 of an external router 500d, respectively. The external routers 500a to 500d are routers of known type having a plurality of ports for receiving a packet from one device (.e.g. a network switching device 100 or another router, not shown) via one physical port and forwarding the packet to another device via another physical port through Layer 3 transport. Hereinafter, in instances where it is unnecessary to distinguish among the four individual external routers 500a to 500d, the external routers will be identified simply by the symbol 500, omitting the letter suffix.

The port I1 of the first switching device 100a is connected to the port I2 of the second switching device 100b, the port I3 of the second switching device 100b to the port I4 of the third switching device 100c, and the port I5 of the first switching device 100a to the port I6 of the third switching device 100c, respectively, via internal transport networks INT1, INT2, INT3. The port M1 of the first switching device 100a, the port M2 of the second switching device 100b, and the port M3 of the third switching device M3 are connected to the port M4 of the manager 200 via a management network MNT.

It is assumed that the ports and networks discussed above be respectively assigned the IP addresses shown in FIG. 4. Herein, the symbol IP_prefixed to the port symbol is used as a symbol to denote the IP address which has been assigned to the port in question. For example, the IP address (192.168.1.2) assigned to port M1 will be denoted using the symbol IP_M1, and the IP address (192.168.10/28) assigned to the network MNT will be denoted using the symbol IP_MNT. The manager 200 acknowledges the IP addresses assigned within the network switching system 1000, specifically, the IP addresses assigned to ports of individual network switching devices 100, and the IP addresses (network addresses) assigned to the external transport networks ONT1-ONT3, the internal transport networks INT1-INT3, and the management network MNT.

Figure 5:
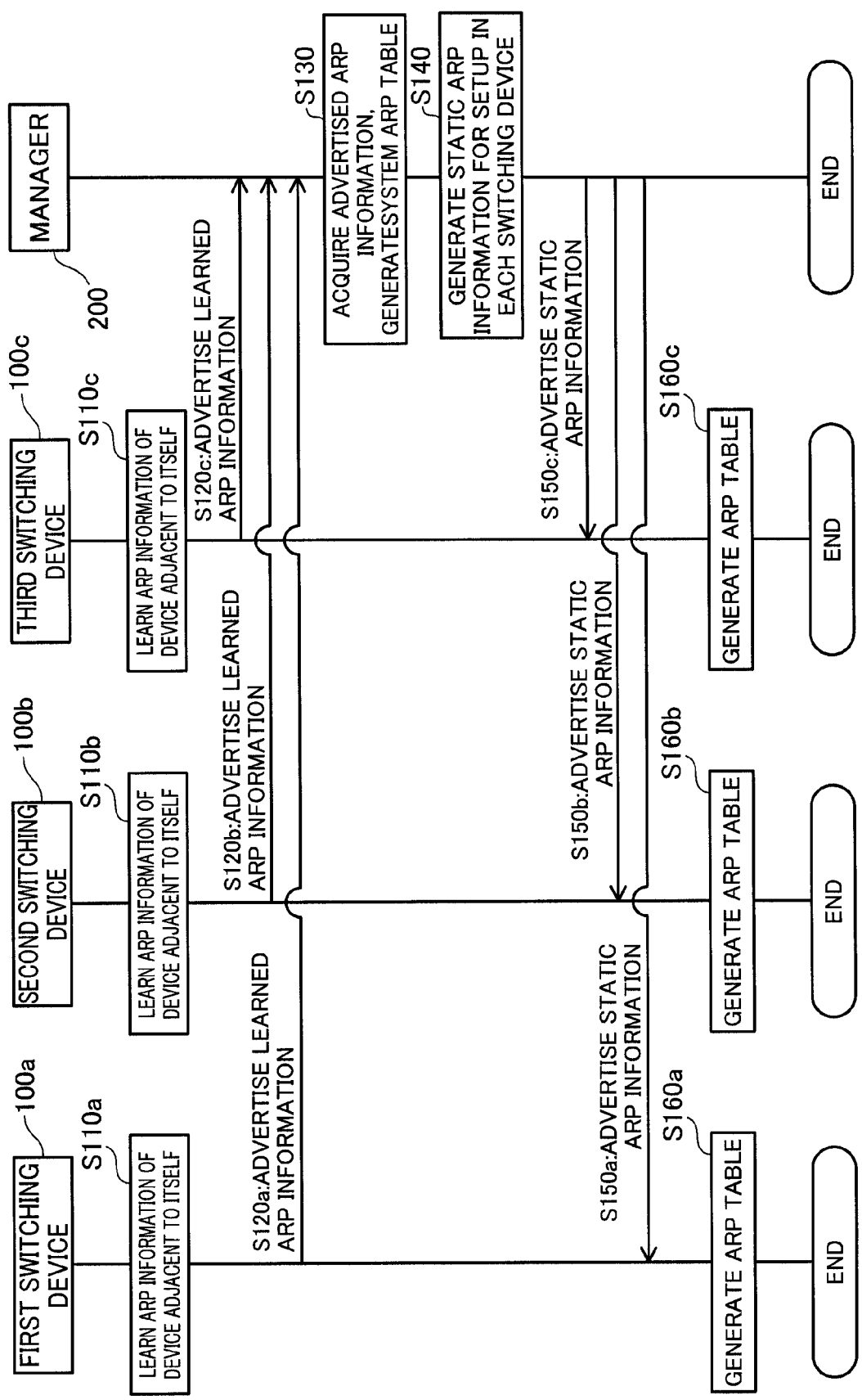
FIG. 5 is a sequence diagram depicting the process sequence of the ARP table setup process.

ARP Table Setup Process:

Next, the ARP table setup process for respectively setting up the ARP tables 136 in the first to third switching devices 100a to 100c will be described with reference to FIGS. 5 through 9. FIG. 5 is a sequence diagram depicting the process sequence of the ARP table setup process. FIG. 6 is an illustration showing ARP information learning results in individual network switching devices. FIG. 7 is a schematic diagram showing a system ARP table. FIG. 8 is an illustration showing static ARP information set up in individual network switching devices. FIG. 9 is an illustration showing ARP tables set up in individual network switching devices.

The ARP information learning module 144 of the controller 140 of an individual network switching device 100 learns the APR information of devices adjacent to itself (FIG. 5: Steps S110a, S110b, S110c). ARP information is acquired, for example, when an adjacent device is powered up, or on a periodic basis. By acquiring such notification, the ARP information learning module 144 dynamically learns the APR information of the devices adjacent to itself. APR information is a combination of IP addresses and MAC addresses assigned to ports in adjacent devices for communicating with oneself. For example, as shown at top in FIG. 6, one item of ARP information learned by the ARP information learning module 144 in the first switching device 100a is the combination of the IP address IP_R1 of the port R1 for communication via the external transport network ONT1 between the first switching device 100a, and the external router 500a which is located adjacently to the first switching device 100a; and the MAC address MAC_R1 of the port R1. Here, the MAC address is actually a 48-bit identification code. In FIG. 6, a symbol consisting of the port symbol prefaced by MAC_ is used as the symbol to denote the MAC address assigned to the port in question instead. For example, the MAC address assigned to the port R1 will be denoted as MAC_R1.

As is apparent from FIG. 6, the ARP information learned in this step by the first switching device 100a for example includes the aforementioned ARP information for the port R1 of the external router 500a, ARP information for the port M1 of the manager 200 located adjacently via the management network MNT, ARP information for the port I2 of the second switching device 100b located adjacently via the internal transport network INT1, and ARP information for the port I6 of the third switching device 100c located adjacently via the internal transport network INT3.

The ARP information learning module 144 of an individual network switching device 100 also learns ARP information in association with its own port through which notification of the ARP information in question is received (the learning port). For example, as is apparent from FIG. 6, the ARP information learning module 144 of the first network switching device 100a learns the ARP information of the port R1 of the external router 500a in association with the port O1 of the first switching device 100a through which the ARP information has been received (in the example of FIG. 6, the IP address IP_O1 is associated with the ARP information of the port R1, by way of the identifier of the port O1).

The ARP information learning module 144 of the individual network switching device 100 then notifies the manager 200 of the learned ARP information, via the management network MNT (Steps S120a, S120b, S120c).

The ARP acquisition module 231 of the ARP information manager 230 of the manager 200 acquires the ARP information advertised by the individual network switching devices 100, and generates the system ARP table 260 (Step S130). This generated system ARP table 260 is depicted in FIG. 7. As shown in FIG. 7, the system ARP table 260 records the ARP information acquired from the network switching devices 100, in association with the delivery port (i.e. IP address thereof), and with the learning source device. Where data is sent to a port assigned an IP address and a MAC address as the ARP information, the delivery port is the port that delivered the data. The learning source device is the network switching device 100 that advertised the ARP information in question. In the system ARP table 260, the upper section SO contains the ARP information of the external devices of the network switching system 1000, i.e. in the case of the first embodiment, the ARP information of the four external routers 500a to 500d. Meanwhile, the lower section SI in the system ARP table contains internal ARP information of the network switching system 1000, i.e. in the case of the first embodiment, the ARP information of the three network switching devices 100. The ARP information SO of the external devices includes ARP information for all external devices adjacent to any of the network switching devices 100 included in the network switching system 1000.

Once the system ARP table 260 is generated, on the basis of the system ARP table 260, the ARP information setup module 232 of the ARP information manager 230 of the manager 200 generates ARP information for static setup in the individual network switching devices 100 (static ARP information). Static ARP information generated in this way and set up for each individual network switching device 100 is shown in FIG. 8. The static ARP information set up for one network switching device 100 consists of ARP information of external devices not adjacent to the network switching device 100 in question, i.e. of external devices adjacent to other network switching devices 100. Where the network switching device 100 in which static ARP information has been set up sends data to a port assigned an IP address and a MAC address by way of static ARP information, the static ARP information is associated with the delivery port which sends the data. For example, as shown in FIG. 8, the static ARP information set up for the first switching device 100a includes ARP information of the port R4 of the external router 500d adjacent to the third switching device 100c. Where the first switching device 100a desires to send data to the port R4 of the external router 500d, the transport takes place via the third switching device 100c. Accordingly, the port I5 for transmission of data to the third switching device 100c is associated as the delivery port with the ARP information set up in the first switching device 100a for the port R4. Static ARP information set up in an individual network switching device 100 includes static ARP information for all external devices that are not adjacent to the network switching device 100 in question, but that are adjacent to any of the other network switching devices 100.

Next, the ARP information setup module 232 advertises the static ARP information generated for use by the individual network switching devices 100 to the respective corresponding network switching devices 100 (Steps S150a to S150c).

The individual network switching devices 100 notified of the static ARP information now use the advertised static ARP information, together with the ARP information previously learned dynamically, to respectively generate the ARP tables 136 (Steps S160a to S160c). The ARP tables 136 generated in the individual network switching devices 100 are depicted in FIG. 8. In order to distinguish among the ARP tables 136 generated respectively in the three network switching devices 100a to 100c, the symbol for each will be suffixed by the same letter which is suffixed to the symbol of the switching device, denoting them as ARP tables 136a to 136c. The ARP information stored in the individual ARP tables 136a to 136c is divided into two types. The first type is the ARP information acquired through dynamic learning in Steps S110a to S110c mentioned above, while the other type is the static ARP information set up (generated) by the manager 200 in Step S140 discussed previously. For example, as shown in FIG. 9, of the ARP information stored in the ARP table 136a of the first switching device 100a, the ARP information for the ports R1, M4, I2, and I6 installed adjacently to the first switching device 100a is of the former type, while the ARP information for the ports R2, R3, and R4 of external routers 500 not adjacent to the first switching device 100a is of the latter type. In each network switching device 100, once the ARP table 136 has been generated, the ARP table creation process terminates.

Figure 10:
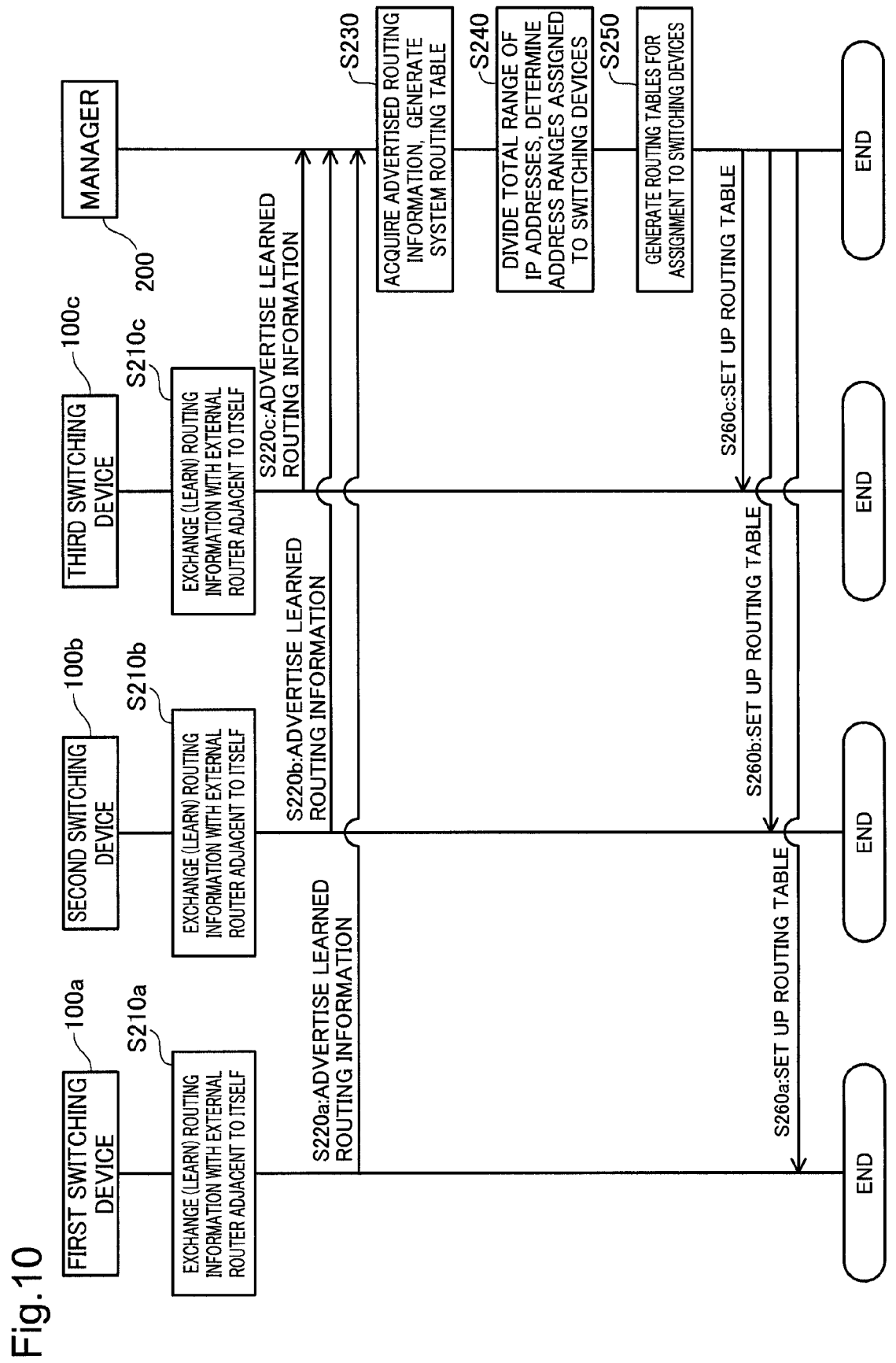
FIG. 10 is a sequence diagram depicting the process sequence of the routing table setup process.

Routing Table Setup Process:

Next, the routing table setup process for respectively setting up the routing tables 135 in the first to third switching devices 100a-100c is described with reference to FIGS. 10 through 14. FIG. 10 is a sequence diagram depicting the process sequence of the routing table setup process. FIG. 11 is an illustration showing routing information held by the network switching system. FIG. 12 is an illustration showing routing information broadcast by individual external routers. FIG. 13 is a schematic diagram showing a system routing table. FIG. 14 is an illustration showing routing tables set up in individual network switching devices.

The routing information learning module 145 of the controller 140 of each individual network switching device 100 learns, through exchange of mutually broadcast routing information with an external router adjacent to itself, the routing information that is broadcast by the external router (FIG. 10: Steps S210a, S210b, S210c). This exchange of routing information is executed in accordance with a routing protocol. The exchanged routing information differs depending on the routing protocol which is supported by the network switching devices 100 and by the external routers 500. For example, the exchanged routing information in RIP consists of the routing tables per se, whereas the exchanged routing information in OSPF consists of link-state. FIG. 11 depicts an example of routing information for the network switching system 1000 as a whole. This routing information for the network switching system 1000 as a whole is held by the manager 200. Of the routing information for the network switching system 1000 as a whole, the routing information broadcast to the external routers 500 consists only of those portions relating to outside the network switching system 1000. In the example of FIG. 11, the routing information broadcast to the external routers 500 consists the portions relating to the external transport networks ONT1 to ONT3 adjacent to the network switching system 1000. Of the routing information for the network switching system 1000 as a whole, those portions relating to inside the network switching system 1000, for example, the portions relating to the internal transport networks INT1 to INT3 and the portion relating to the management network MNT, are not broadcast to the external routers 500. The reason is so that the network switching system 1000 appears as a single network switching device to the external routers 500. The routing information broadcast to the external routers 500 is advertised to the individual network switching devices 100 by the manager 200.

FIG. 12 shows routing information broadcast by individual external routers 500. The routing information broadcast by the external router 500*a* is learned by the first network switching device 100*a* situated adjacent to the external router 500*a*. Analogously, the routing information broadcast by the external router 500*b* is learned by the second network switching device 100*b*; the routing information broadcast by the external router 500*c* and the routing information broadcast by the external router 500*d* are learned by the third network switching device 100*c*, respectively.

The routing information learning module 145 of each individual network switching device 100 then notifies the manager 200 of the learned routing information, via the management network MNT (Steps S220*a*, S220*b*, S220*c*).

The routing information acquisition module 241 of the routing information manager 240 acquires the routing information advertised by each of the network switching devices 100, and the system routing table creation module 243 of the routing information setup module 242 of the routing information manager 240 then generates the system routing table 250 (Step S230). The system routing table 250 so generated is depicted in FIG. 13. As shown in FIG. 13, the system routing table 250 is a routing table wherein the entire network switching system 1000 is viewed as a single switching device. On the basis of the acquired routing information, the system routing table creation module 243 calculates optimal routing in accordance with rules specified by the routing protocol, in order to generate the system routing table 250.

Next, the address range division module 244 of the routing information setup module 242 divides the entire network address range (0.0.0.0-255.255.255.255) into address ranges equal in number of the network switching devices 100 (three in the first embodiment), and determines assigned address ranges for assignment to each of the individual network switching devices 100 (Step S240). As shown in FIG. 13, in the first embodiment, the assigned address range for assignment to the first switching device 100*a* is determined as 0/2 (0.0.0.0-63.255.255.255), the assigned address range for assignment to the second switching device 100*b* as 64/2 (64.0.0.0-127.255.255.255), and the assigned address range for assignment to the third switching device 100*c* as 128/1 (128.0.0.0-63.255.255.255), respectively.

This determination of address ranges is done in such a way that the routing tables 135 generated in the individual network switching devices 100 in subsequent steps are of substantially identical size.

Next, the routing table creation module 245 of the routing information setup module 242 generates routing tables 135 for assignment to (setup in) each of the network switching devices 100 (Step S250). FIG. 14 depicts routing tables 135 generated for each individual network switching device 100 in which they are set up. In order to distinguish among the routing tables 135 set up respectively in the three network switching devices 100*a* to 100*c*, the symbol for each of the tables is suffixed by the same letter same to the suffix of the symbol of the switching device, denoting them as routing tables 135*a* to 135*c*.

As shown in FIG. 14, each routing table 135 is a table associating IP address ranges described in terms of routing information and mask length, with forwarding destination devices. In FIG. 14, the IP address of a port of the forwarding destination device is used as the identifier for the forwarding destination device. Through lookup of this information, the Layer 3 transport module 132 of a network switching device 100 is able to determine the forwarding destination device for an Ethernet frame. Specifically, the Layer 3 transport module 132 searches the routing table 135 for an IP address range containing the destination IP address included in the Ethernet frame. The Layer 3 transport module 132 then identifies the device which corresponds to the IP address associated with the found IP address range as the forwarding destination device for the frame.

Here, in each routing table 135, where an IP address included in the assigned address range assigned to the network switching device 100 in which the table has been set up is intended to be forwarded to an external router 500, the external router 500 in question is associated with the IP address as the forwarding destination device, regardless of whether the external router 500 is adjacent to the network switching device 100 in question or not. For example, an Ethernet frame having as its destination IP address an IP address included in the range 50.0.0.0/8 should be forwarded to the external router 500*b*, which is not adjacent to the first switching device 100*a*. In this case, as shown in FIG. 14, in the routing table 135*a* which has been set up in the first switching device 100*a* assigned the range 50.0.0.0/8, an IP address in the range 50.0.0.0/8 will be associated not with the port I2 of the second switching device 100*b* between the first switching device 100*a* and the external router 500*b*, but rather to the port R2 of the external router 500*b*, as the forwarding destination device.

Meanwhile, in each routing table 135, where IP addresses included in unassigned address ranges not assigned to the network switching device 100 in which the table in question has been set up has associated therewith, as the forwarding destination device, the other network switching devices 100 to which these unassigned addresses have been assigned. For example, in the routing table 135*a* set up in the first switching device 100*a*, the assigned address range of the second switching device 100*b*, namely, 64/2 (64.0.0.0-127.255.255.255) is associated with the port I2 of the second switching device 100*b*.

Here, in each routing table 135 an IP address having a "-(local)" association indicates that an Ethernet frame having that IP address as the destination IP address is addressed to the network switching device 100 in which the routing table 135 in question is stored.

Next, in each of the respective network switching devices 100, the routing information setup module 242 sets up the routing tables 135*a* to 135*c* generated for use by the individual network switching devices 100 (Steps S260*a* to S260*c*). Specifically, the routing tables 135*a* to 135*c* are transmitted respectively to the controller 140 of the corresponding network switching device 100 via the management network MNT, and then stored in the memory 134 of the transport processing circuit 130 by the controller 140 of the network switching device 100. Once the routing tables 135*a* to 135*c* have been set up in the corresponding network switching devices 100, the routing table setup process terminates.

Operation of Network Switching System 1000:

Once the ARP table setup process and the routing table setup process discussed above have been carried out, the network switching system 1000 assumes a state virtually operable as a single network switching device.

Figure 15:
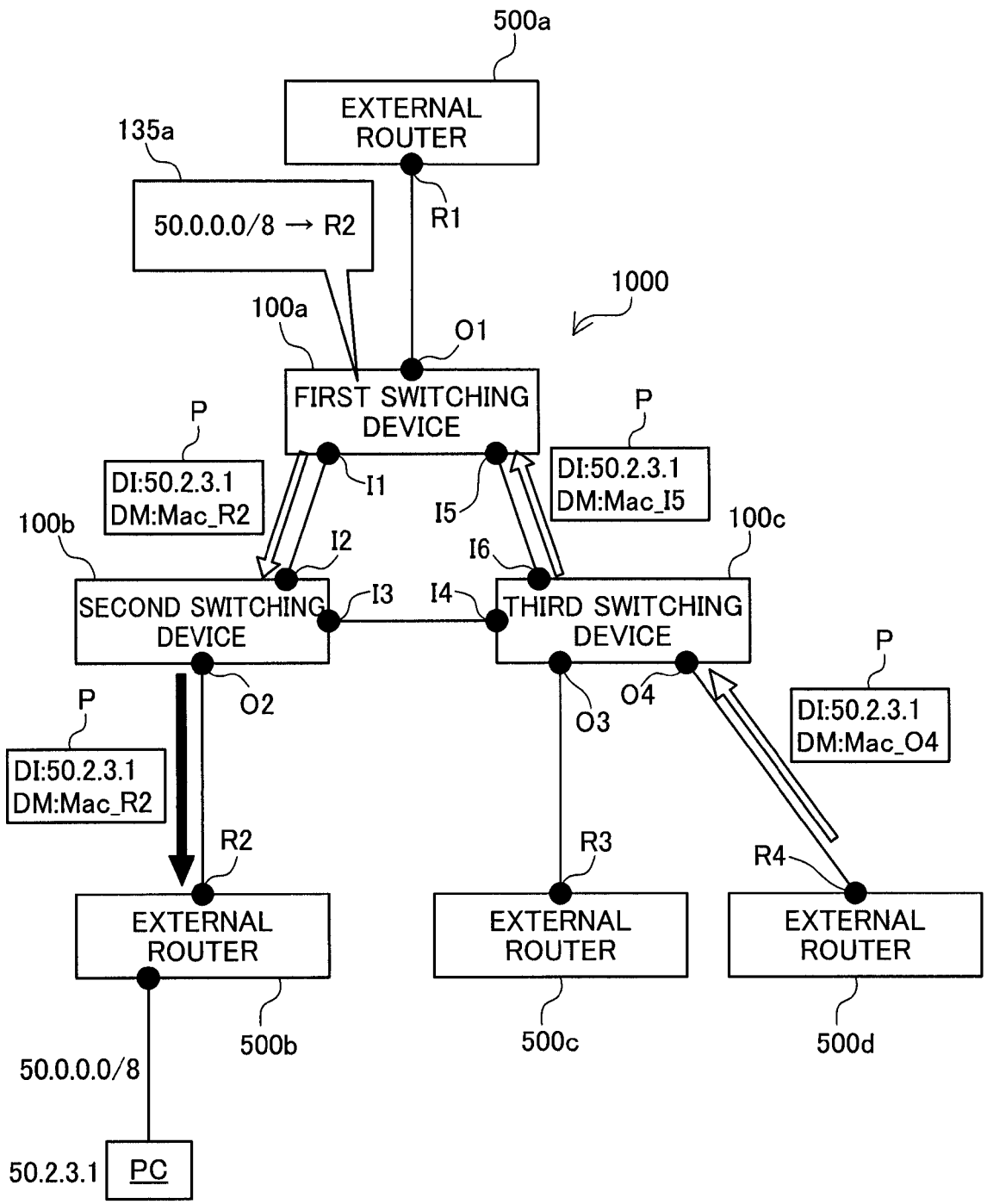
FIG. 15 is an illustration depicting operation of the network switching system according to the first embodiment.
Figure 16:
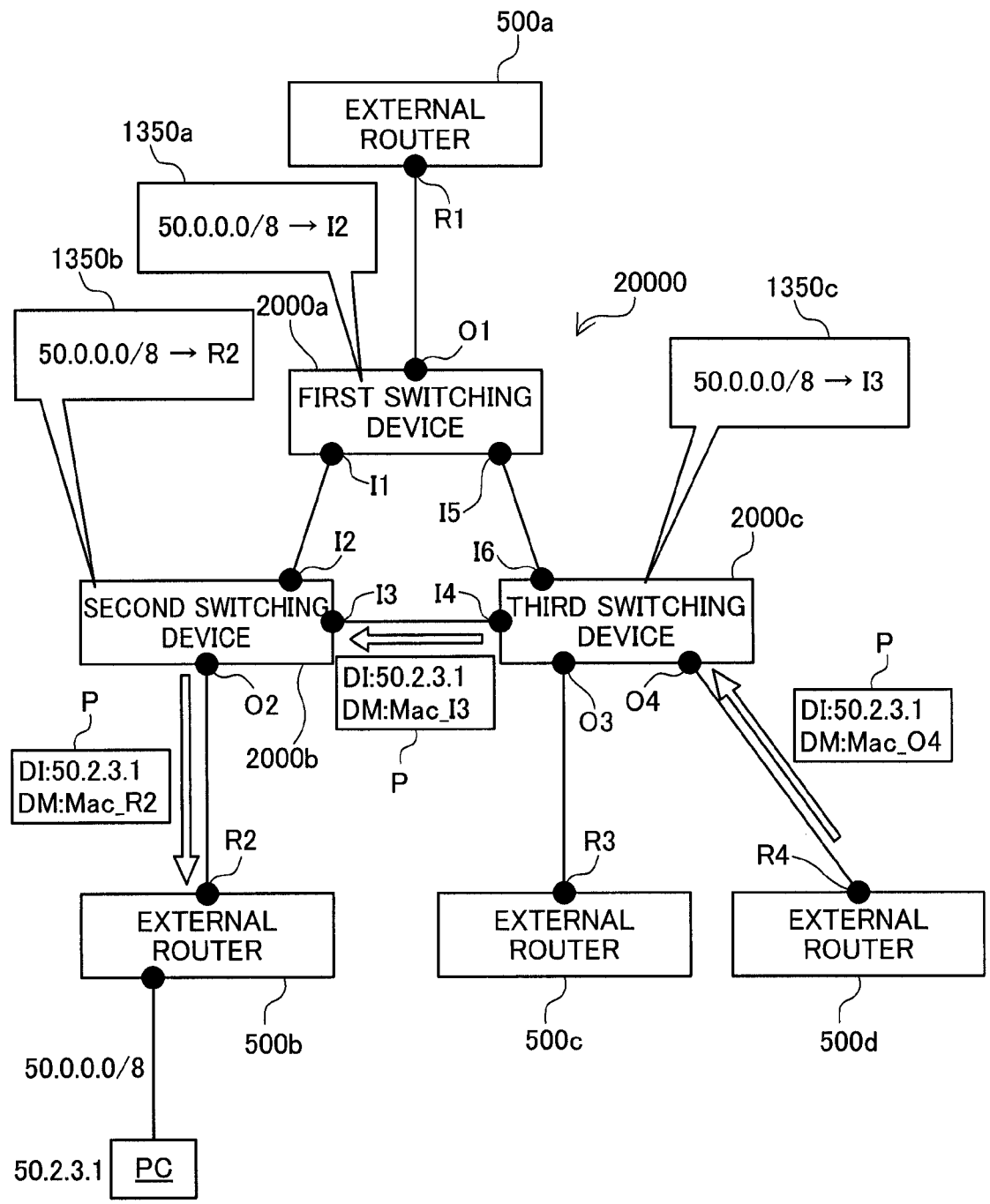
FIG. 16 is an illustration depicting operation of the network switching system according to a comparative example.

Operation of the network switching system 1000 will be described with reference to FIGS. 15 and 16. FIG. 15 is an illustration depicting operation of the network switching system in the first embodiment. FIG. 16 is an illustration depicting operation of the network switching system according to a comparative example.

Operation of the network switching system 1000 according to the first embodiment will be described taking by way of example an instance where an Ethernet frame P having a destination IP address DI of 50.2.3.1 forwarded from the external router 500*d*. In this instance, the external router 500*d* forwards an Ethernet frame to the third switching device 100*c*, while specifying the MAC address MAC_O4 of the port O4 of the third switching device 100*c* as the destination MAC address DM (FIG. 15). Since the destination MAC address DM of the Ethernet frame P is the MAC address MAC_O4 assigned to the third switching device 100*c* itself, when the third switching device 100*c* receives the Ethernet frame P, the Layer 3 transport module 132 of the third switching device 100*c* looks up the routing table 135*c* on the basis of the destination IP address DI to determine the forwarding destination. Since the destination IP address DI=50.2.3.1 is the assigned address of the first switching device 100*a*, the Layer 3 transport module 132 of the third switching device 100*c* determines that the first switching device 100*a* is the forwarding destination device. Specifically, the Layer 3 transport module 132 of the first switching device 100*a* identifies the IP address IP_I5 of the port I5 of the first switching device 100*a* as being the forwarding destination (FIG. 14: see the second entry from the bottom of the routing table 135*c*). The Layer 3 transport module 132 of the third switching device 100*c* then looks up and identifies from the ARP table 136*c* the MAC address MAC_I5 corresponding to the IP address IP_I5, and the delivery port I6 of the Ethernet frame P (FIG. 9: see the lowermost entry of the ARP table 136*c*). As a result, the third switching device 100*c* changes the destination MAC address DM of the Ethernet frame P to MAC_I5 and transports the Ethernet frame P from the port I6 to the first switching device 100*a* through Layer 3 (FIG. 15).

When the first switching device 100*a* receives the Ethernet frame P, since the destination MAC address DM of the Ethernet frame P is a MAC address MAC_I5 assigned to the first switching device 100*a* itself, the Layer 3 transport module 132 of the first switching device 100*a* looks up the routing table 135*a* on the basis of the destination IP address DI and determines the forwarding destination. Since the destination IP address DI=50.2.3.1 is an assigned address of the first switching device 100*a*, the Layer 3 transport module 132 of the first switching device 100*a* determines that the external router 500*b* is the forwarding destination device. Specifically, the Layer 3 transport module 132 of the first switching device 100*a* identifies the IP address IP_R2 of the port R2 of the external router 500*b* as being the forwarding destination (FIG. 14: see the fourth entry from the top of the routing table 135*a*). The Layer 3 transport module 132 of the first switching device 100*a* then looks up and identifies from the ARP table 136*a* the MAC address MAC_R2 corresponding to the IP address IP_R2, and the delivery port I1 of the Ethernet frame P (FIG. 9: see the third entry from the top of the ARP table 136*a*). As a result, the first switching device 100*a* changes the destination MAC address DM of the Ethernet frame P to MAC_R2 and transports the Ethernet frame P from the port I6 to the second switching device 100*b* through Layer 3 (FIG. 15).

When the second switching device 100*b* receives the Ethernet frame P, since the destination MAC address DM of the Ethernet frame P is not a MAC address assigned to the second switching device 100*b* itself, the Layer 2 transport module 133 of the second switching device 100*b* looks up the ARP table 136*b* on the basis of the destination IP address DI to determine the forwarding destination. Specifically, the Layer 2 transport module 133 identifies the delivery port IP_O2 associated with the destination MAC address DM=MAC_R2. As a result, the second switching device 100*b* transports the Ethernet frame P as-is to the external router 500*b* through Layer 2 (FIG. 15). In FIG. 14, the white arrows show Layer 3 transport, and the black arrow shows Layer 2 transport.

Through the operation described above, the Ethernet frame P forwarded from the external router 500*d* is transported to the external router 500*b* through the network switching system 1000.

Next, consider an instance in which the Ethernet frame P mentioned previously is forwarded from the external router 500*a*. In this case, the external router 500*a* forwards the Ethernet frame to the first switching device 100*a*, while specifying the MAC address MAC_O1 of the port O1 of the first switching device 100*a* as the destination MAC address DM.

When the first switching device 100*a* receives the Ethernet frame P, since the destination MAC address DM of the Ethernet frame P is a MAC address MAC_O1 assigned to the first switching device 100*a* itself and the destination IP address DI is within its own assigned address range, a process similar to that carried out when the Ethernet frame P is received from the third switching device 100*c* discussed previously is carried out. Specifically, the first switching device 100*a* changes the destination MAC address DM of the Ethernet frame P to MAC_R2 and transports the Ethernet frame P from the port I1 to the second switching device 100*b* through Layer 3.

When the second switching device 100*b* receives the Ethernet frame P, the second switching device 100*b* forwards the Ethernet frame P as-is to the external router 500*b* through Layer 2 in a manner analogous to that discussed previously.

A better understanding will be afforded here through a description of a network switching system according to a comparative example, made with reference to FIG. 16. The network switching system 20000 according to the comparative example is a system having three network switching devices (first to third network switching devices 2000*a* to 2000*c*) which here are conventional routers, interconnected in the same way as in the first embodiment. In order to avoid confusion, the ports are assigned the same symbols as in FIG. 15.

As with the description of operation of the network switching system 1000 according to the first embodiment, operation of the network switching system 20000 according to the comparative example will be described taking by way of example an instance where an Ethernet frame P having a destination IP address DI of 50.2.3.1 has been forwarded from the external router 500*d*. In this instance, in the same way as above, the external router 500*d* forwards the Ethernet frame to the third switching device 2000*c*, while specifying the MAC address MAC_O4 of the port O4 of the third switching device 2000*c* as the destination MAC address DM. When the third switching device 2000*c* receives the Ethernet frame P, the third switching device 2000*c* refers to the destination IP address DI and identify the second switching device 2000*b* as the next forwarding destination, Accordingly, as shown in FIG. 16, it is necessary for the routing table 1350*c* of the third switching device 2000c to include a description of the forwarding destination of the destination IP address DI=50.2.3.1 as being as the port I3 of the second switching device 2000b. The third switching device 2000c then changes the destination MAC address DM of the Ethernet frame P to MAC_I3, and transport through Layer 3 the Ethernet frame P from the port I4 to the second switching device 2000b (FIG. 16).

When the second switching device 2000b receives the Ethernet frame P, the second switching device 2000b refers to the destination IP address DI and identifies the port R2 of the external router 500b which is the next forwarding destination. Consequently, as shown in FIG. 16, it is necessary for the routing table 1350b of the second switching device 2000b to include a description of the forwarding destination of the destination IP address DI=50.2.3.1 as being the port R2 of the external router 500b. The second switching device 2000b then changes the destination MAC address DM of the Ethernet frame P to MAC_R2, and transport through Layer 3 the Ethernet frame P from the port O2 to the external router 500b (FIG. 16).

Next, consider a case where, in the same manner as the description of operation of the network switching system 1000 according to the first embodiment, the Ethernet frame P mentioned previously is forwarded from the external router 500a in the network switching system 20000 according to the comparative example. In this case, as mentioned above, the external router 500a forwards the Ethernet frame to the first switching device 2000a, while specifying the MAC address MAC_O1 of the port O1 of the first switching device 2000a as the destination MAC address DM. When the first switching device 2000a receives the Ethernet frame P, the first switching device 2000a refers to the destination IP address DI and identifies the port I2 of the second switching device 2000b which is the next forwarding destination. Consequently, as shown in FIG. 16, it is necessary for the routing table 1350a of the first switching device 2000a to include a description of the forwarding destination of the destination IP address DI=50.2.3.1 as being the port I2 of the second switching device 2000b. The first switching device 2000a then changes the destination MAC address DM of the Ethernet frame P to MAC_I2, and transport through Layer 3 the Ethernet frame P from the port I1 to the second switching device 2000b.

When the second switching device 2000b receives the Ethernet frame P, in the same way as described above, the second switching device 2000b changes the destination MAC address DM of the Ethernet frame P to MAC_R2, and transports through Layer 3 the Ethernet frame P from the port O2 to the external router 500b.

As is apparent from the preceding description, in the network switching system 20000 according to the comparative example it is necessary for the first to third switching devices 2000a to 2000c to include in their respective routing tables a description of the forwarding destination of the destination IP address DI=50.2.3.1. Similarly, it is apparent that, ultimately, the first to third switching devices 2000a to 2000c need respectively retain detailed forwarding destinations for the entire range of IP addresses.

With the network switching system 1000 according to the first embodiment on the other hand, the routing table 135 in each individual network switching device 100 (see FIG. 14) describes detailed forwarding destinations only for those IP addresses that are included in the assigned address range assigned to itself; for IP addresses of unassigned address ranges, other network switching devices 100 having those unassigned address ranges as their assigned address ranges are described as the forwarding destinations. This is accomplished: (1) for IP addresses of the assigned address ranges, by describing external routers 500 not located adjacent to oneself as direct forwarding destinations in the routing tables 135; and (2) in the ARP tables 136, by setting up the MAC addresses of external routers 500 not located adjacent to oneself as static ARP information. Accordingly, size of the routing tables 135 in the individual network switching devices 100 may be reduced than in a conventional manner. This allows the network switching system 1000 as a whole to keep a larger amount of routing information. Thus, for the network switching system 1000 as a whole, adjacency relationships is able to be made with a greater number of external devices (in the first embodiment, the external routers 500). Additionally, it is possible to increase the number of routes handleable by the network switching system 1000 as a whole, as well as to increase the number of external devices connectable in adjacency relationships, according to the number of network switching devices 100 included in the network switching system 1000, thereby making it possible to easily enhance the processing capability of the network switching system 1000 by expanding the number of network switching devices 100 in the network switching system 1000.

In particular, where the network switching devices 100 is configured to store the routing table 135 entries into a high speed memory such as a CAM (Content Addressable Memory) and to carry out the routing process with a hardware for the purpose of speeding up the routing process, the required capacity of the high speed memory may be reduced, or more routes may be handled with a limited high speed memory capacity.

As is apparent from the preceding description, in the first embodiment, where a destination IP address is an assigned IP address, data is forwarded on the basis of a MAC address of the external router 500 associated with the IP address. Meanwhile, for an unassigned address, data is forwarded to another network switching device 100 that has been assigned the unassigned address in question. Accordingly, an individual network switching device 100 in the first embodiment can be said to function both as an unassigned data transport unit for forwarding Ethernet frames to other switching devices in the event that a destination network layer address is an unassigned address not assigned to itself, and as an assigned data transport unit for identifying MAC addresses of a forwarding destination device corresponding to a destination network layer address and forwarding Ethernet frames thereto in the event that the destination network layer address is an assigned address assigned to itself.

Figure 17:
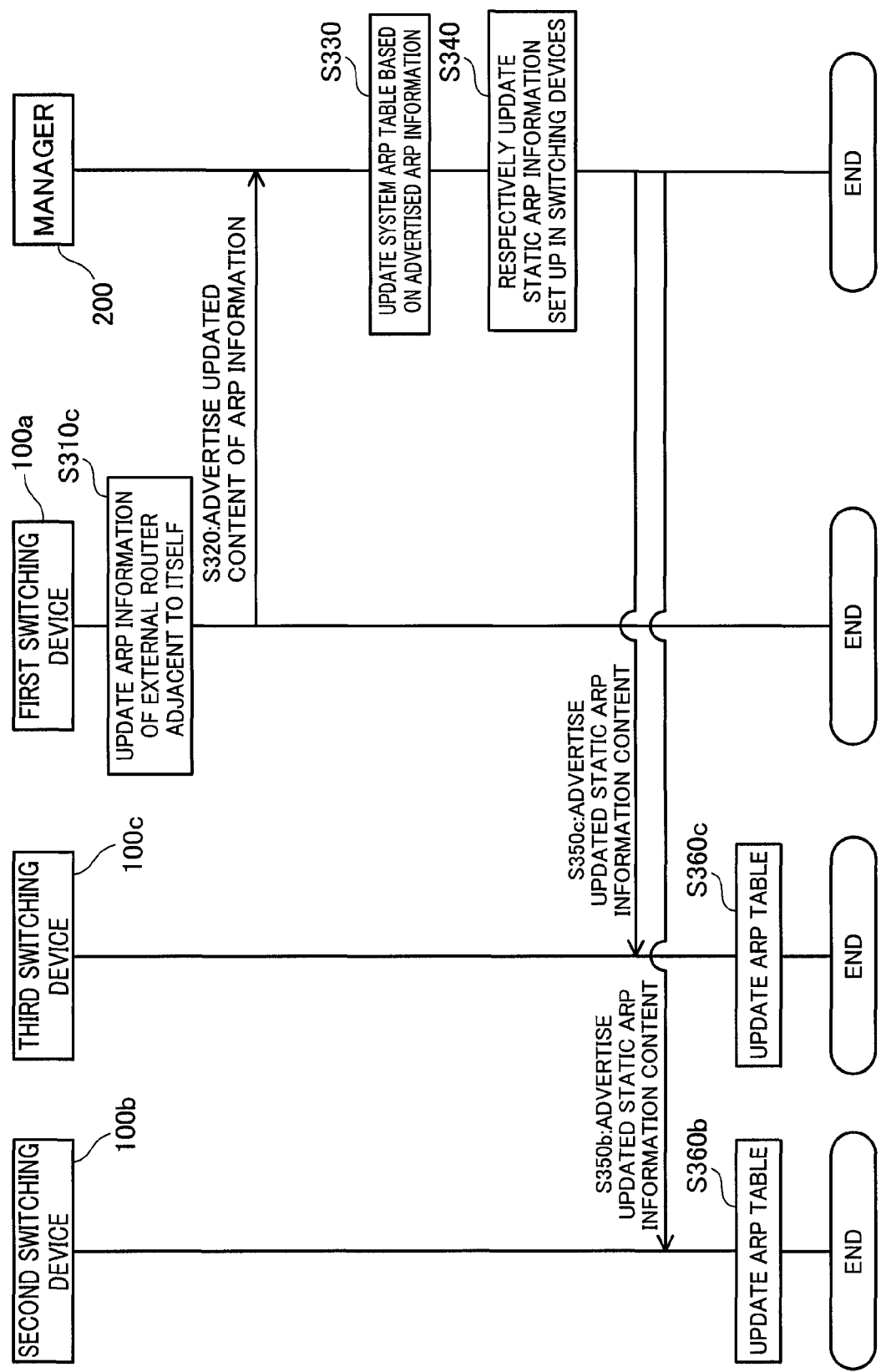
FIG. 17 is a sequence diagram showing the sequence of an ARP table update process.
Figure 18:
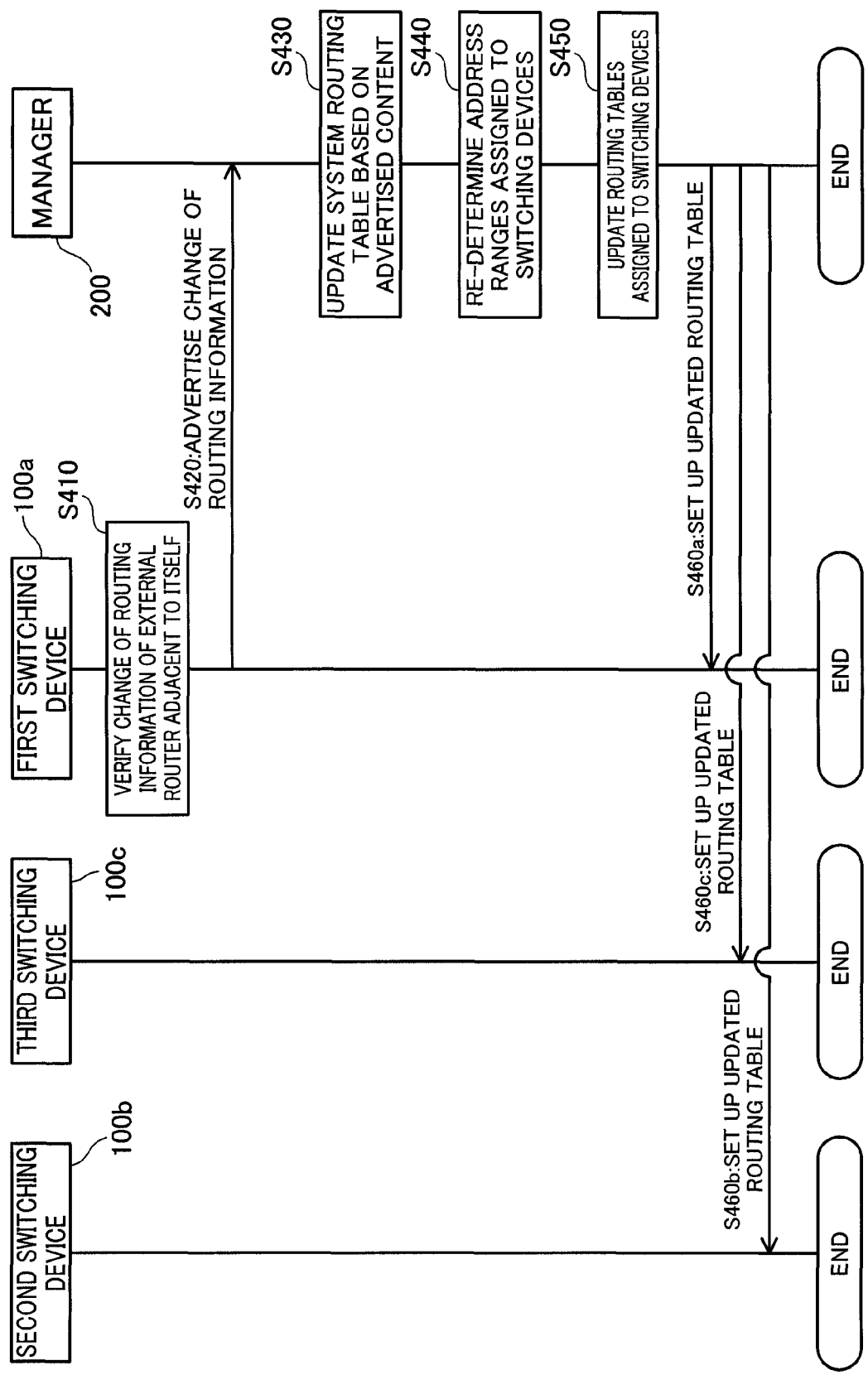
FIG. 18 is a sequence diagram showing the sequence of a routing table update process.

Process in the Event of a Change in an Adjacency relationship in the Network Switching System:

The process which takes place in the event of a change in an adjacency relationship in the network switching system 1000 is described with reference to FIGS. 17 and 18. FIG. 17 is a sequence diagram showing the sequence of an ARP table update process. FIG. 18 is a sequence diagram showing the sequence of a routing table update process.

In the event that an adjacency relationship in the network switching system 1000 is changed—in this case the ARP information learned dynamically by a given network switching device 100 changes—an ARP table update process is carried out. A change in dynamically learned ARP information may occur, for example, in the event of destruction of ARP information caused by loss of communication due to a link disturbance with an external router 500 adjacent to a given network switching device 100; or when there is additional ARP information associated with connection of a new external router 500 adjacent to a given network switching device 100. Below, the ARP table update process will be described taking the example of a case where the ARP information dynamically learned by the first switching device 100a is changed.

When the ARP information dynamically learned by the first switching device 100a is changed, the ARP information learning module 144 of the controller 140 of the first switching device 100a recognizes the change and updates the ARP information recorded in its own ARP table 136 (Step S310c). The change in ARP information may be recognized by the ARP information learning module 144, for example, by being notified of ARP information of a new external router 500 in association with connection of the external router 500; or for existing ARP information, through age-out of ARP information in the absence of any notification for a prescribed time period.

The ARP information learning module 144 then advertises the updated content of the ARP information to the manager 200 (Step S320). On the basis of the advertised updated content of the ARP information, the ARP information acquisition module 231 of the ARP information manager 230 now updates the system ARP table 260 (Step S330). On the basis of the updated system ARP table 260, the ARP information setup module 232 of the ARP information manager 230 then respectively updates the static ARP information which has been set up statically in the other network switching devices 100, namely, the second switching device 100b and the third switching device 100c (Step S340). The ARP information setup module 232 now respectively advertises the updated static ARP information to the second switching device 100b and the third switching device 100c (Steps S350b, S350c). The second switching device 100b and the third switching device 100c which have been advertised the updated static ARP information content respectively update their own ARP tables 136 on the basis of the advertised content (Steps S360b, S360c). Once the ARP tables 136 have been updated, the ARP table update process terminates.

In the event an adjacency relationship in the network switching system 1000 is changed, here, a change in the routing information dynamically learned by a given network switching device 100, a routing table update process is carried out. A change in dynamically learned routing information may occur, for example, in the event of destruction of routing information caused by loss of communication due to a link disturbance with an external router 500 adjacent to a given network switching device 100; or where additional routing information is acquired due to connection of a new external router 500 adjacent to a given network switching device 100, with updated routing information being acquired from the adjacent external router 500.

Below, the routing table update process will be described taking the example of a case where there has been a change in the routing information that was dynamically learned by the first switching device 100a. When the routing information dynamically learned by the first switching device 100a is changed, the routing information learning module 145 of the controller 140 of the first switching device 100a recognizes the change (Step S410). The change in routing information may be recognized by the routing information learning module 145, for example, by learning routing information which is broadcast by a newly connected external router 500, or by recognizing through disruption of periodic communication that an adjacency relationship to a previously adjacent external router 500 has been eliminated.

The routing information learning module 145 then notifies the manager 200 of the change in the routing information (Step S420). Specifically, the routing information learning module 145 notifies the manager 200 of the new learned routing information, or of elimination of the adjacency relationship to a previously adjacent external router 500. When the manager 200 receives notification of the change in routing information, on the basis of the advertised content, the system routing table creation module 243 of the routing information setup module 242 of the routing information manager 240 updates the system ARP table 260 (Step S430). For example, if notified of new routing information, the system routing table creation module 243 uses the new routing information in addition to the existing routing information to recalculate optimal transport routes in accordance with the routing protocol and update the system ARP table 260. If notified of elimination of an adjacency relationship, the system routing table creation module 243 deletes the routing information broadcast by the external router 500 whose adjacency relationship is eliminated, and on the basis of the remaining routing information recalculates optimal transport routes in accordance with the routing protocol to update the system ARP table 260.

Next, the address range division module 244 of the routing information setup module 242 re-divides the entire range of network addresses, and re-determines the assigned address ranges assigned to individual network switching devices 100 (Step S440). In accordance with the results of re-determination of the divided ranges, the routing table creation module 245 of the routing information setup module 242 respectively updates the routing tables 135a to 135c assigned to the individual network switching devices 100 (Step S450). The routing information setup module 242 then sets up the updated routing tables 135a to 135c for use by the network switching devices 100, in the respective corresponding network switching devices 100 (Steps S460a to S460c). Once the routing tables 135a to 135c have been set up in the respective corresponding network switching devices 100 in this way, the routing table update process terminates.

By carrying out the ARP table update process and the routing table update process described above as needed in response to changes in adjacency relationships in the network switching system 1000, the network switching system 1000 may be maintained in a condition enabling correct transport operations of the Ethernet frames as described above.

B. Second Embodiment

Figure 19:
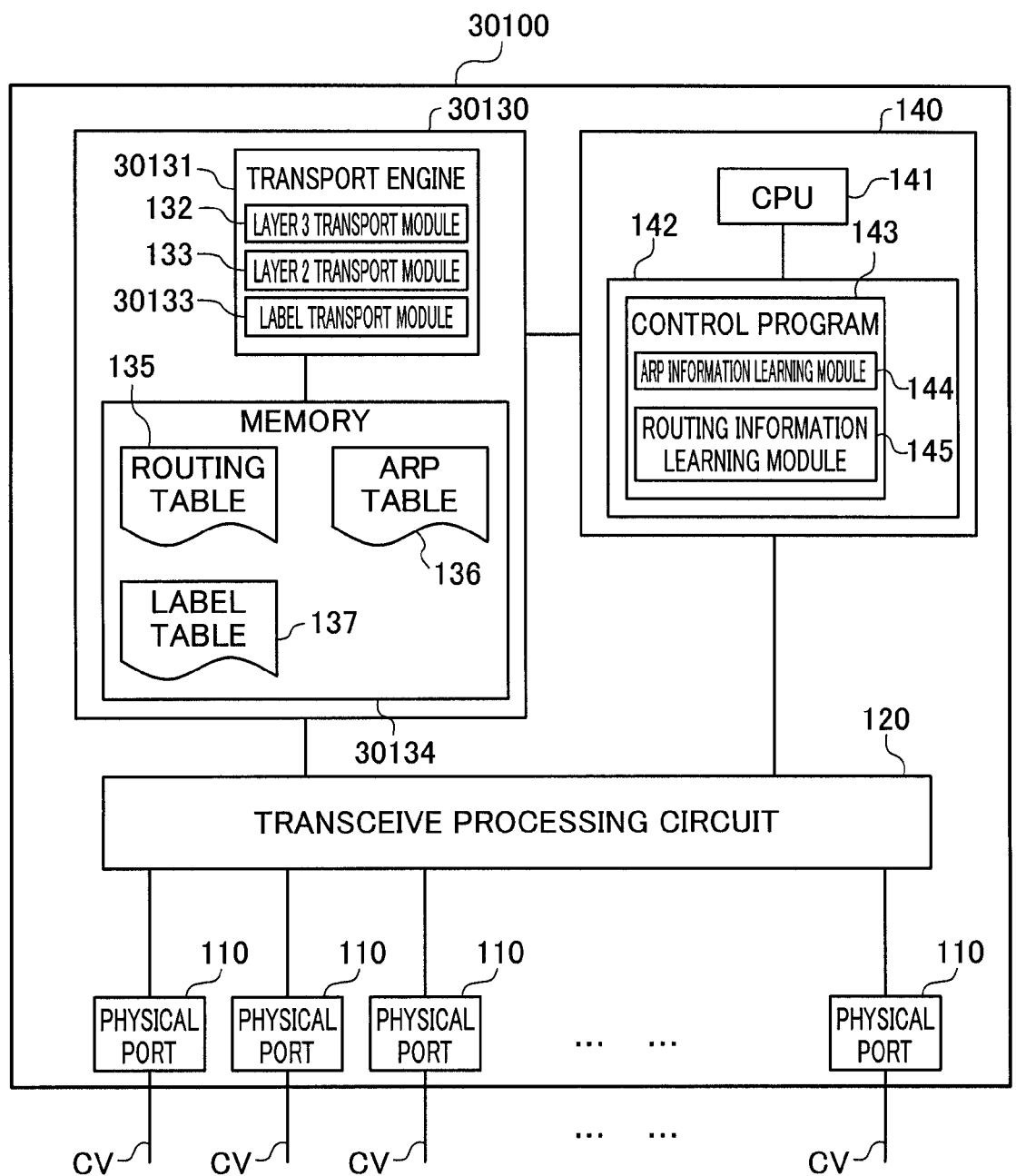
FIG. 19 is a block diagram depicting the internal configuration of a network switching device according to a second embodiment.

FIG. 19 is a block diagram depicting the internal configuration of a network switching device according to a second embodiment. The network switching device 30100 of the second embodiment differs from the network switching device 100 of the first embodiment shown in FIG. 2 in that the transport engine 30131 has a label transport module 30133, and a label table 137 is stored in the memory 30134. In the network switching device 30100 of the second embodiment, the Layer 3 transport module 132 has the function of looking up the routing table 135 and appending a label (described later) based on IP address. In other respects the device is similar to the network switching device 100 of the first embodiment.

The label transport module 30133 performs forwarding of packets (label transport) on the basis of an identifier (label) which specifies the forwarding destination device and is appended to the packet. In the second embodiment, MPLS (Multi-Protocol Label Switching) is used as the label transport protocol. MPLS (RFC 3031, 3032) is a protocol standardized by the IETF (Internet Engineering Task Force). In the MPLS protocol, packet transport is carried out on the basis of labels at an additional label transport layer lying between the data link layer and the network layer. Specifically, for a packet in the network layer, a label of fixed length indicating the destination of the packet is appended to the packet, and the packet with the appended label (labeled packet) is transported in accordance with the label. Thus, label transport in MPLS takes place through an added label transport layer between Layer 3 and Layer 2 of the OSI (Open Systems Interconnection) model, the label transport in MPLS is also referred to as Layer 2.5 transport. Since the label transport layer represents an intermediate layer between the data link layer and the network layer, it can also be called an "intermediate layer." The labeled packet is data including an identifier (label) in the intermediate layer, so the labeled packet can also be called "intermediate layer data."

In the event that an Ethernet frame received from the transceive processing circuit 120 contains a label, the label transport module 30133 swaps the label of the received labeled packet. The label transport module 30133 carries out label swapping through lookup of the label table 137, which describes rules for swapping labels (label swapping rules). The label swapping rules register, in association with a combination of a reception port that received a labeled packet with the label contained in the labeled packet, a delivery port for delivery of the labeled packet, and a label for swapping purposes (swapping label).

The label table 137 is set up among adjacent devices in such a way that label swapping is carried out for packets to reach the intended router or switch (target transport destination device). Since the label table 137 registers labels that are set up among adjacent devices, it is equivalent to the ARP table in Ethernet. The label swapping rules described in the label table 137 are fixed rules set up in advance by the manager 200. However, in a manner analogous to learning of routing information and ARP information in the first embodiment, it is possible for information for determining settings in the label table 137 to be acquired by the network switching system 31000 from an adjacent device, and for the settings in the label table 137 to be determined on the basis of the acquired information. For example, such settings of the label table 137 may be carried out using LDP (Label Distribution Protocol) and so on.

After label swapping, the label transport module 30133 specifies the delivery port described in the label table 137 and forward the Ethernet frame containing the labeled packet to the transceive processing circuit 120. As a result, the Ethernet frame is forwarded to the forwarding destination device corresponding to the label of the received labeled packet. In the network switching device 30100 shown in FIG. 19, the label transport module 30133 forwards the labeled packet via the transceive processing circuit 120, which performs transmission and reception of Ethernet frames. For this reason, Ethernet™ is used as data link layer for label transport. For the dada link layer, so long as the label transport is capable, any other protocol such as ATM (Asynchronous Transfer Mode) or PoS (PPP over SDH/SONET) may also be used. In this case, the network switching device 30100 is provided with the appropriate transceive circuit and physical ports for the protocol.

In the routing table 135 of the second embodiment, an IP address, which lies in the assigned address range assigned to the device itself, is directly associated with a label that indicates the router at the terminus of label transport by MPLS as the target transport destination device (referred to as the "egress router"). In this case, the Layer 3 transport module 132 appends a label pointing to the egress router to the IP packet, and the labeled packet is forwarded based on the appended label. On the other hand, an IP address lying in an unassigned address range, which is not assigned to the device itself, is associated with another device other than itself to which the unassigned address range is assigned as the forwarding destination device. In this case, the Layer 3 transport module 132 forwards the IP packet to the network switching device 30100 for which the IP address is the assigned address range, in the same manner as in the first embodiment.

Figure 20A:
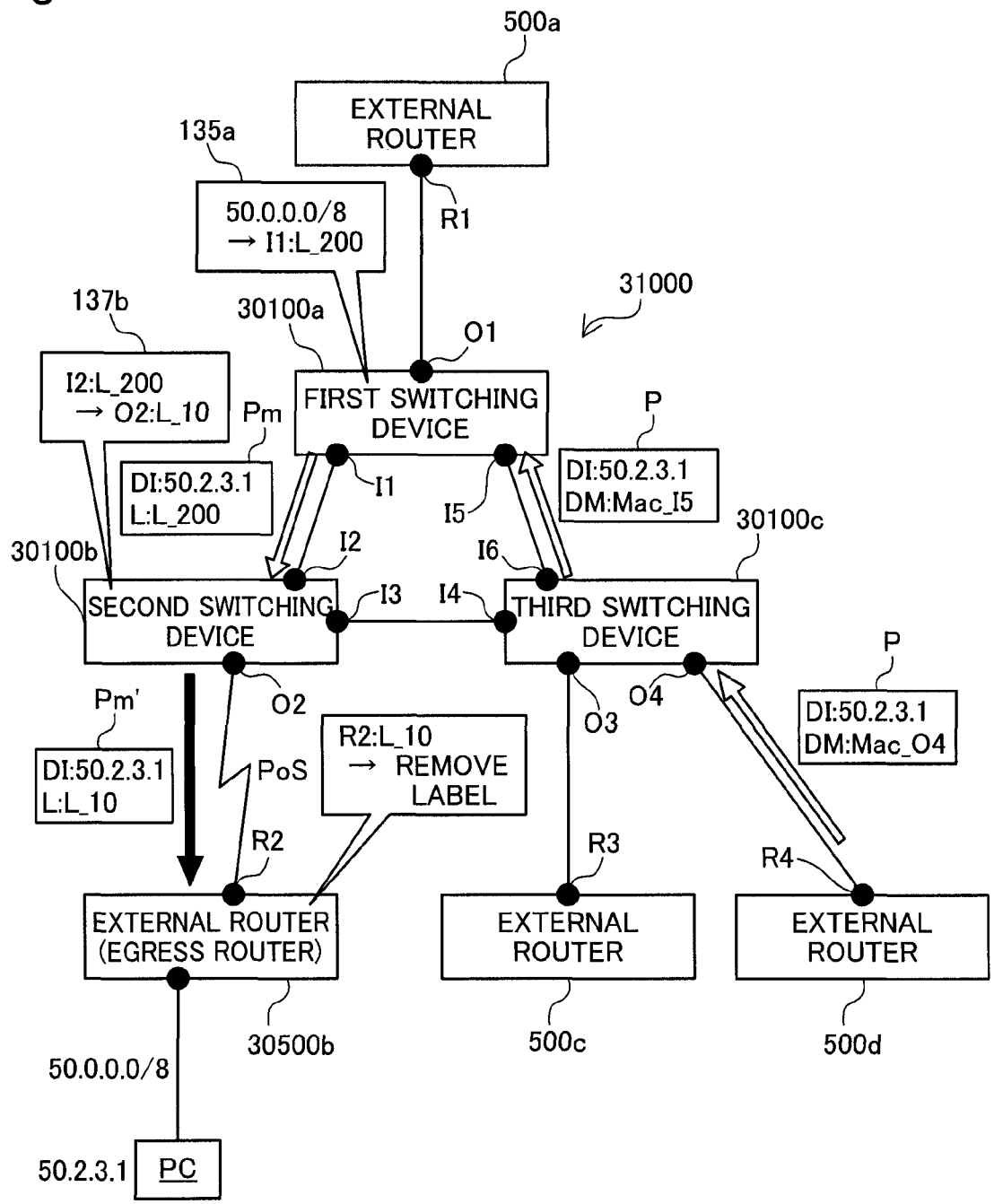
FIG. 20A is an illustration depicting operation of the network switching system according to the second embodiment.
Figure 20B:
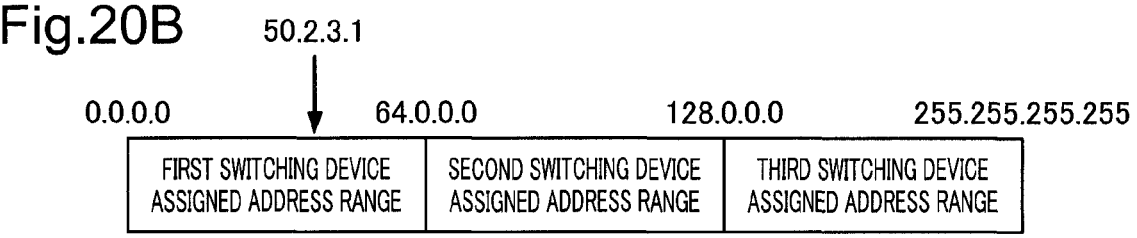
FIG. 20B is an illustration depicting assignment of the entire range of IP addresses to individual network switching devices.

FIG. 20A is an illustration depicting operation of the network switching system according to the second embodiment. FIG. 20B is an illustration depicting assignment of the entire range of IP addresses to individual network switching devices 30100. FIG. 20A differs from FIG. 15 in that data transport between a second network switching device 30100b and an external router 30500b takes place by MPLS; and the data link layer connecting the second network switching device 30100b and the external router 30500b is PoS based. In other respects it is the same as FIG. 15. Also, as in FIG. 15, the manager 200 is omitted from the illustration in FIG. 20A in order to avoid a complicated drawing.

The example of FIG. 20A illustrates a case in which an Ethernet frame P whose destination IP address DI is 50.2.3.1 has been forwarded from an external router 500d. In this case, the external router 500d forwards the Ethernet frame to the third network switching device 30100c while specifying MAC address MAC_O4 of the port O4 of the third network switching device 30100c as the destination MAC address DM. As shown in FIG. 20B, the destination IP address DI=50.2.3.1 is the assigned address range of the first network switching device 30100a. Thus, in the same way as in the first embodiment, the Ethernet frame P forwarded to the third network switching device 30100c is forwarded from the third network switching device 30100c to the first network switching device 30100a.

The destination MAC address DM of the Ethernet frame P forwarded to the first network switching device 30100a is the MAC address MAC_I5 of the first network switching device 30100a itself. Also, the destination IP address DI=50.2.3.1 is the assigned address range of the first network switching device 30100a. Therefore, when the Layer 3 transport module 132 of the first network switching device 30100a receives the Ethernet frame P, the Layer 3 transport module 132 looks up the routing table 132 and determines an egress router for transport of the packet to the network address (50.0.0.0/8) of the destination IP address DI (=50.2.3.1). In this way, the first network switching device 30100a appends to the Ethernet frame P a label transport layer MPLS header in which a label (L_200) pointing the external router 30500b is set. After appending the MPLS header, the first network switching device 30100a forwards the Ethernet frame Pm with the appended MPLS header, from the port I1 of the first network switching device 30100a to the port I2 of the second network switching device 30100b.

The Ethernet frame Pm contains the label L_200. Thus, when the second network switching device 30100b receives the Ethernet frame Pm from the port I2, the label transport module 30133 of the second network switching device 30100b looks up the label table 137b to determine a delivery port and a swapping label. In the example of FIG. 20A, the port O2 connected to the port R2 of the external router 30500b is associated as the delivery port, and the label L_10 representing the external router 30500b is associated as the swapping label, with the port O2 and the label L_200 respectively. As a result, the label transport module of the second network switching device 30100b forwards the labeled packet Pm' (whose label is swapped to L_10) from the port O2 of the second network switching device 30100b to the external router 30500b.

The external router 30500*b*, which is the egress router, looks up the label table and decides not to carry out label transport for the port R2 and the label L_10. In this case, the label transport module of the external router 30500*b* removes the label from the labeled packet Pm' to generate an Ethernet frame P which does not include a label. In this way, an Ethernet frame P forwarded from the external router 500*c* to the network switching system 31000 is forwarded to the external router 30500*b*. The external router 30500*b* then forwards the Ethernet frame P thus forwarded to the external router 30500*b*. In this way, the Ethernet frame P forwarded by the external router 30500*b* arrives at the PC corresponding to the destination IP address is 50.2.3.1.

The second network switching device 30100*b* performs removal of the label from the labeled packet forwarded from the external router 30500*b*. An Ethernet frame P is then generated from the IP packet whose label is removed, and the Ethernet frame thus generated is forwarded in the same manner as in the first embodiment. Removal of the label from the labeled packet forwarded from external router 30500*b* may be also carried out by another network switching device 30100, such as the first network switching device 30100*a*. However, in this case, depending on the destination of the IP packet transported within a labeled packet, the number of transport among network switching devices 30100 may increase. For this reason, it is preferable for label removal to be carried out by the network switching device 30100 which is adjacent to the external router 30500*b* that forwards data using MPLS. Label removal is carried out in instances where a labeled packet has a label specifying label removal. In this case, specification of label removal is equivalent to specifying that the labeled packet not be forwarded, and in this sense a label which specifies label removal can be said to be a label destined for the device itself.

In this way, in a manner similar to Layer 2 transport using static APR in the first embodiment, by carrying out label transport it is possible in the second embodiment as well to perform packet transport to the egress router from a network switching device 30100 with assigned address range including the destination IP address, without the use of a routing table 30135. Accordingly, in the second embodiment as well, size of the routing tables 30135 in the individual network switching devices 30100 may be reduced. Consequently, for the network switching system 31000 as a whole, adjacency relationships may be generated for more external devices, and it is possible to easily enhance the processing capability of the network switching system 31000 by expanding the number of network switching devices 30100. Moreover, as with Layer 2 transport in the first embodiment, transport by MPLS does not increase number of hops. Thus, the number of hops when an Ethernet frame P is routed through the network switching system 31000 does not exceed two.

In the second embodiment, packet transport between the second network switching device 30100*b* and the external router 30500*b* is carried out by MPLS. For this reason, as noted above, packet transport may be carried out despite the second network switching device 30100*b* and the external router 30500*b* being connected by PoS. That is, in the second embodiment, the protocol of the data link layer may be a protocol different from Ethernet. Accordingly, even in instances where the connection with an external router or other network switching device is not an Ethernet connection, the network switching devices 30100 is able to operate as a single virtual network switching device. In this way, the second embodiment is preferable to the first embodiment in that connections among the network switching devices 30100 and other network switching devices is able to be set up more flexibly. On the other hand, the first embodiment employs the more common Layer 2 transport, and thus is preferable to the second embodiment in that it is easier to configure the network switching system 1000.

C. Third Embodiment

Figure 21A:
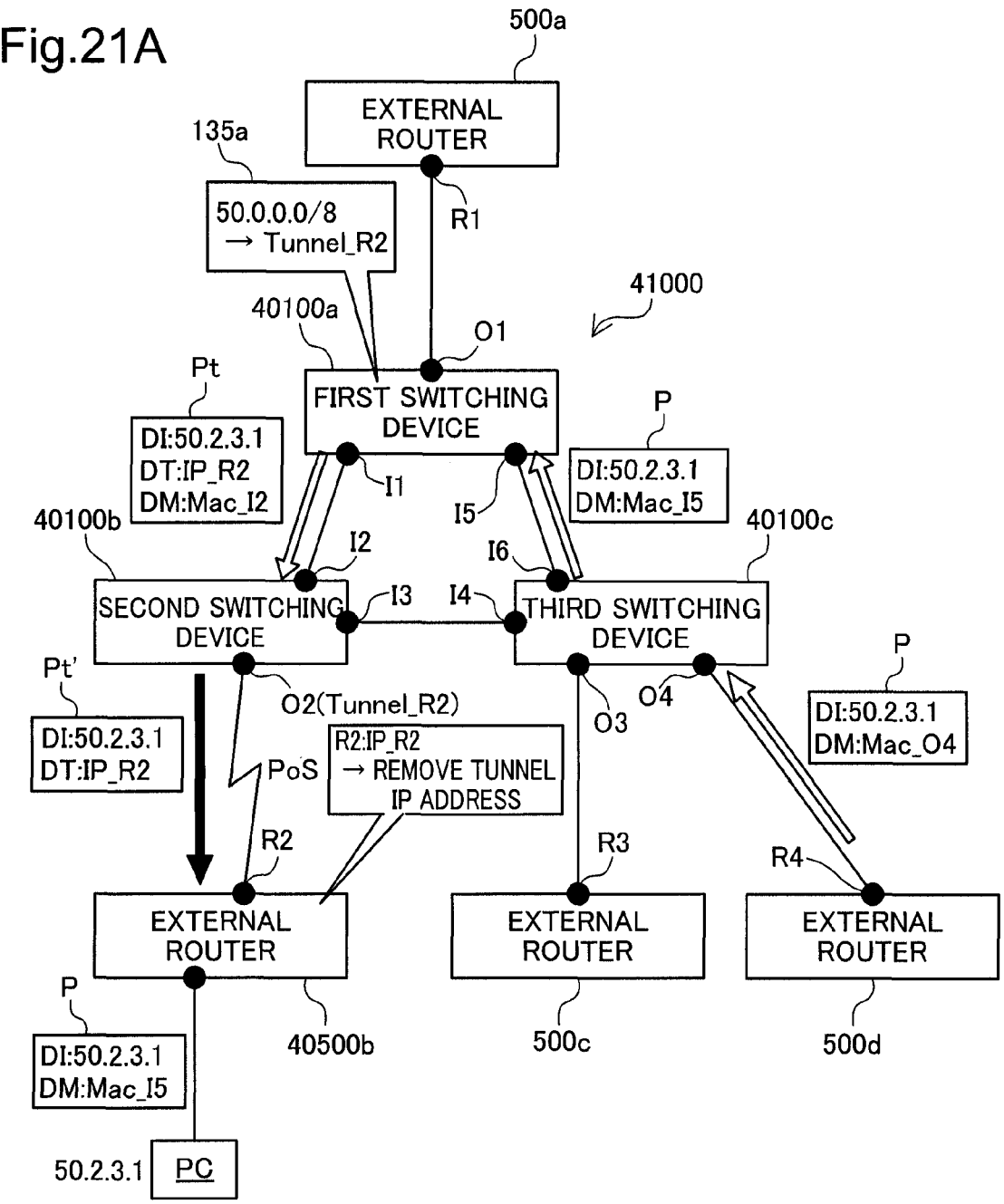
FIG. 21A is an illustration depicting operation of the network switching system according to the third embodiment.
Figure 21B:
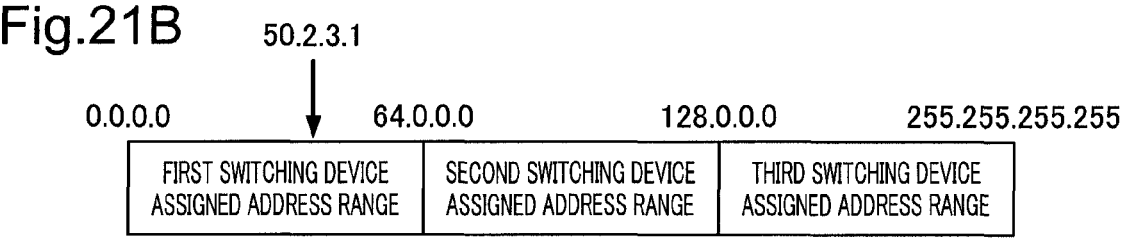
FIG. 21B is an illustration depicting assignment of the entire range of IP addresses to individual network switching devices.

FIG. 21A is an illustration depicting operation of the network switching system according to the third embodiment. FIG. 21B is an illustration depicting assignment of the entire range of IP addresses to individual network switching devices. FIG. 21A differs from FIG. 15 in that an IP tunnel (discussed later) is set up between a second network switching device 40100*b* and an external router 40500*b*; and the data link layer connecting the second network switching device 40100*b* and the external router 40500*b* is PoS based. In other respects it is the same as FIG. 15. Also, as in FIG. 15, the manager 200 is omitted from the illustration in FIG. 21A in order to avoid a complicated drawing. Since the individual network switching devices 40100 according to the third embodiment are substantially identical to the individual network switching devices in the first embodiment, they will not be discussed here.

IP tunnel transport refers to a packet transport method for transporting IP packets (tunnel packets), whereby the IP packet being transported (transported packet) is encapsulated in a data carrier. Specifically, the router which has received the transported packet generates a tunnel packet from the transported packet, and the tunnel packet thus generated is transported to a router at the end point of the IP tunnel (tunnel end-point router). The tunnel end-point router then removes the IP header from the received tunnel packet, de-encapsulates the transported packet, and forwards the de-encapsulated transported packet. As a result, the transported packet is transported to intended destination. By carrying out transport through an IP tunnel in this way, as long as IP packets are deliverable, it is possible to connect geographically or logically disparate networks. IP tunnel transport is used, for example, when setting up a VPN (Virtual Private Network) or when using as the data link layer a protocol other than Ethernet, such as ATM or PoS.

As is apparent from the above description, the IP tunnel layer in which IP tunnel transport takes place is provided between the data link layer and the network layer. For this reason, the IP tunnel layer can be said to be an intermediate layer between the data link layer and the network layer. Tunnel packets in the IP tunnel layer can be referred to as intermediate layer data, and IP addresses of tunnel packets can be termed intermediate layer identifiers. In the third embodiment, IP packets are used as the tunnel packets. It is also possible to use packets in accordance with another protocol as the tunnel packets.

In the example of FIG. 21A, an IP tunnel is set up between IP_O2 of the second switching device 40100*b* and IP_R2 of the external router 40500*b*. In the ARP tables 136 of the first switching device 40100*a* and the third switching device 40100*c*, a virtual port Tunnel_R2 provided to the second switching device 40100*b* is registered in place of static ARP information, by way of IP tunnel information representing the fact that an IP tunnel has been set up between the second switching device 40100*b* and the external router 40500*b*. As with the static ARP information in the first embodiment, the virtual port Tunnel_R2 is set up by the manager 200.

In the routing tables 135 of each individual network switching device 40100, forwarding destination devices are associated with IP addresses in the assigned address range assigned to device itself. If the forwarding destination device is the external router 40500*b*, the virtual port Tunnel_R2 is associated with the IP address. This is analogous to the routing tables 135 in the first embodiment.

The example of FIG. 21A illustrates an instance in which an Ethernet frame P with a destination IP address DI of 50.2.3.1 is forwarded from the external router 500*d*. In this case, the external router 500*d* specifies the MAC address MAC_O4 of the port O4 of the third switching device 40100*c* as the destination MAC address DM, and forwards the Ethernet frame to the third switching device 40100*c*. As shown in FIG. 21B, the destination IP address DI=50.2.3.1 is the assigned address range of the first switching device 40100*a*. Accordingly, the Ethernet frame P forwarded to the third switching device 40100*c* is now transported from the third switching device 40100*c* to the first switching device 40100*a* through Layer 3, in the same manner as in the first embodiment.

The destination MAC address DM of the Ethernet frame P forwarded to the first switching device 40100*a* is a MAC address MAC_I5 belonging to the first switching device 40100*a* itself. The destination IP address DI 50.2.3.1 is the assigned address range of the first switching device 40100*a*. Accordingly, upon receiving the Ethernet frame P, the Layer 3 transport module 132 of the first switching device 40100 looks up the routing table 135 and determines the forwarding destination device to which to forward the IP packet having the destination IP address DI (=50.2.3.1).

In the example of FIG. 21A, the forwarding destination device to which the IP packet having the destination IP address DI (=50.2.3.1) is forwarded is the external router 40500*b*. Thus, the first switching device 40100*a* acquires the virtual port Tunnel_R2 from the routing table 135. The first switching device 40100*a* thereby adds a tunnel packet header to the transported packet contained in the Ethernet frame P, and generates an Ethernet frame Pt containing the tunnel packet. Specifically, the first switching device 40100*a*, using the IP address which represents the setup information of the virtual port Tunnel R2, appends an IP header which sets the IP address IP_R2 of the external router 40500*b* as the destination IP address DT and the IP address IP_O2 of the port O2 of the second switching device 40100*b* as the sender IP address, to generate a tunnel packet.

Next, the first switching device 40100 generates an Ethernet frame Pt containing the generated tunnel packet, and forwards the generated Ethernet frame Pt to the switching device 40100*b* with the IP tunnel which is set up with the forwarding destination device, i.e. the external router 40500*b*. Specifically, the first switching device 40100*a* refers to the ARP table 136, and acquires the virtual port Tunnel_R2 information instead of static ARP information. The first switching device 40100*a* thereby determines the destination MAC address DM to be a MAC address MAC_I2 of the second switching device 40100*b*. The first switching device 40100*a* then appends to the tunnel packet a MAC header setting the MAC address MAC_I2 determined in this way as the destination MAC address, and generates the Ethernet frame Pt. The generated Ethernet frame Pt is forwarded from the port I1 of the first switching device 40100*a* to the port I2 of the second switching device 40100*b*. In this way, in the third embodiment, in contrast to ordinary IP tunnel transport in which tunnel packets are generated in the switching device furnished with the virtual port, tunnel packets are also generated in the switching device 40100*a* different from the switching device 40100*b* furnished with the virtual port Tunnel_R2.

The destination MAC address of the Ethernet frame Pt is the MAC address MAC_I2 of the port I2 of the second switching device 40100*b*. Therefore, when the second switching device 40100*b* receives the Ethernet frame Pt, the Layer 3 transport module of the second switching device 40100*b* looks up the ARP table 136 on the basis of the destination IP address DT of the tunnel packet, and determines the forwarding destination device. As a result, the second switching device 40100*b* forwards the tunnel packet Pt' generated by the first switching device 40100*a*, to the external router 40500*b*, which is the forwarding destination device.

The sender IP address of the tunnel packet Pt' is an IP address IP_O2 of the port O2 of the second switching device 40100*b* with which the IP tunnel to the external router 40500*b* is set up. Therefore, the external router 40500*b*, which is the tunnel end-point router, recognizes that the tunnel packet Pt' is a packet of the IP tunnel, and removes the IP header and de-encapsulates the transported packet from the tunnel packet Pt'. A MAC header is appended to the transported packet by the external router 40500*b*, and an Ethernet frame P including the transported packet is generated. In this way, the Ethernet frame P forwarded from the external router 500*c* to the network switching system 41000 is transported to the external router 40500*b*. The external router 40500*b* then forwards the transported Ethernet frame P. As a result, the Ethernet frame P transported to the external router 40500*b* reaches the PC with destination IP address DI is 50.2.3.1.

The second switching device 40100*b* performs removal of the IP header from the tunnel packet forwarded from the external router 40500*b* with which the IP tunnel is set up. An Ethernet frame is then generated from the transported packet from which the IP header is removed, and the transported packet thus generated is transported analogously to the first embodiment. Thus, in the same manner as in the second embodiment, it is possible to prevent an increase in number of transport hops among network switching devices 40100.

In this way, by carrying out IP tunnel transport, it is possible in the third embodiment as well to perform packet transport to the tunnel end-point router from a network switching device 40100 with assigned address range including the destination IP address. Accordingly, in the third embodiment as well, size of the routing tables 135 in the individual network switching devices 40100 may be reduced. Consequently, for the network switching system 41000 as a whole, adjacency relationships may be generated for more external devices, and it is possible to easily enhance the processing capability of the network switching system 41000 by expanding the number of network switching devices 40100. Moreover, as with Layer 2 transport in the first embodiment, transport by an IP tunnel does increase number of hops. Thus, the number of hops when an Ethernet frame P is routed through the network switching system 41000 does not exceed two.

In the third embodiment, packet transport between the second network switching device 40100*b* and the external router 40500*b* is carried out through IP tunnel transport. For this reason, as noted above, packet transport may be carried out despite the second network switching device 40100*b* and the external router 40500*b* being connected by PoS. That is, in the third embodiment as in the second embodiment, a protocol different from Ethernet may be used as the protocol of the data link layer. Accordingly, even in instances where the connection with an external router or other network switching device is not an Ethernet connection, the network switching devices 40100 is able to operate as a single virtual network switching device. In this way, the third embodiment is preferable to the first embodiment in that connections among the network switching devices 40100 and other network switching devices is able to be set up more flexibly. Also, the third embodiment employs IP tunnel transport which is more common than MPLS, and thus is preferable to the second embodiment in that it is easier to configure the network switching system 41000.

D. Modifications

Modification 1:

In the preceding embodiments, an example in which three network switching devices 100 are interconnected is shown. The number of network switching devices 100 included in the network switching system may be changed to any number, and the mode of connection of the network switching devices 100 may be modified as desired as well. For example, it is possible to have four network switching devices 100, connected in a linear configuration, a ring configuration, or a star configuration.

Figure 22:
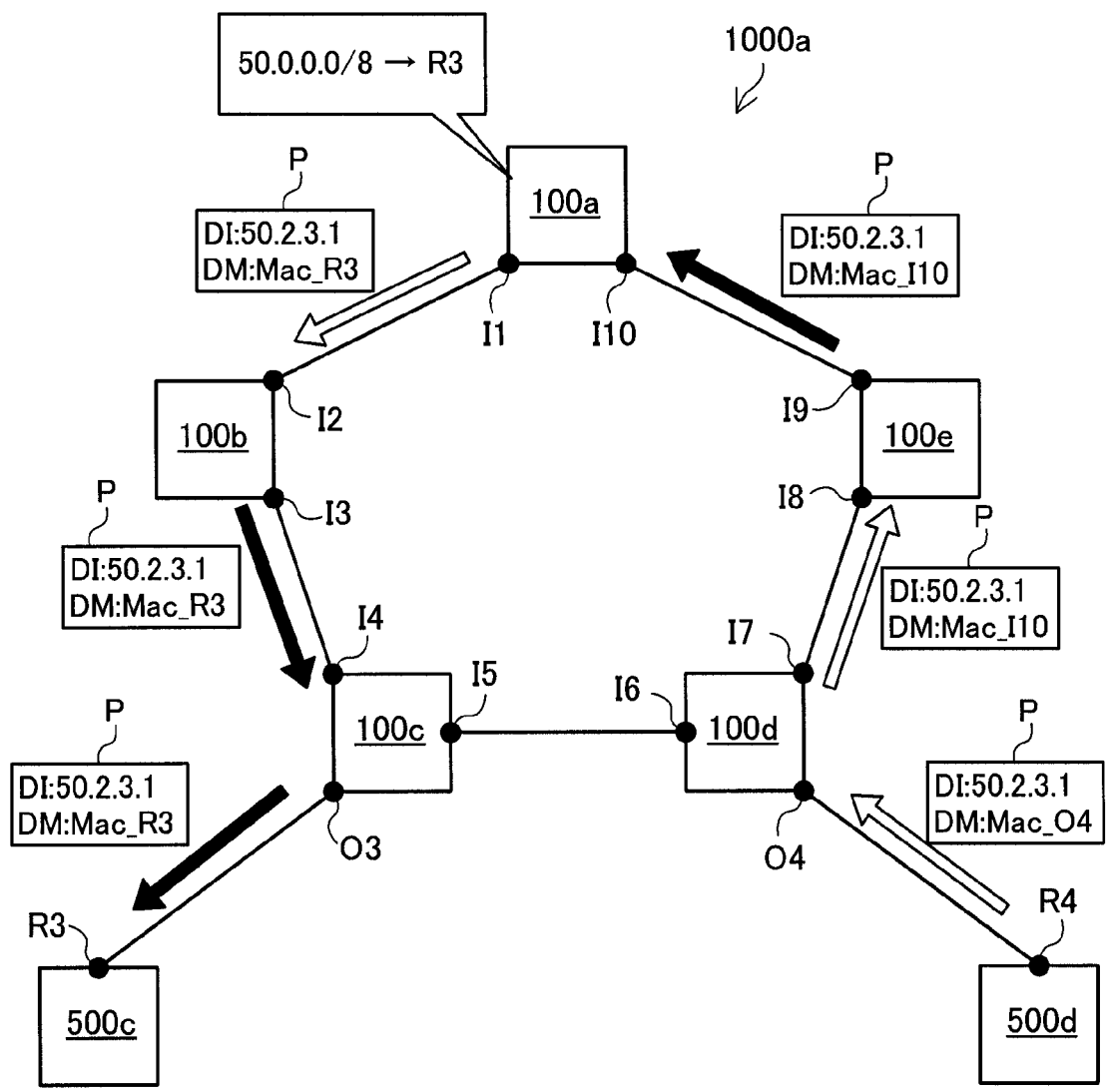
FIG. 22 is an illustration depicting a network switching system according to the first modification.

FIG. 22 is an illustration depicting a network switching system according to the first modification. A network switching system 1000*a* containing five network switching devices 100 (first to fifth switching devices 100*a* to 100*e*) connected in a ring configuration will be described as the first modification, making reference to FIG. 22. Similar to the first embodiment, the network switching system 1000*a* according to this modification has a manager 200 connected via a management network MNT to the individual network switching devices 100*a* to 100*e*. In FIG. 22 the manager 200 is omitted from the illustration in order to avoid a complicated drawing.

As in the first embodiment, with the ARP table 136 in each individual network switching device 100 in the first modification records static ARP information of external routers 500 and other network switching devices 100 which are not located adjacently to the device itself, in addition to (dynamically learned) ARP information of external routers 500 and other network switching devices 100 situated adjacently to the device itself.

As in the first embodiment, in the routing table 135 of each network switching device 100 of the first modification, not only external routers 500 situated adjacently to itself, but also external routers 500 situated adjacently to other network switching devices 100 itself are associated directly with IP addresses in the assigned address range assigned to each device. Meanwhile, as in the first embodiment, in the routing table 135 of each network switching device 100 of the first modification, devices other than itself which are assigned the unassigned address ranges in question are associated as forwarding destination devices with IP addresses in unassigned address ranges not assigned to a device itself.

The operation of the network switching system 1000*a* according to the first modification will be described taking by way of example an instance where an Ethernet frame P having a destination IP address DI of 50.2.3.1 forwarded from the external router 500*d*. In this instance, the external router 500*d*, while specifying a MAC address MAC_O4 of the port O4 of the fourth switching device 100*d* as the destination MAC address DM, forwards an Ethernet frame to the fourth switching device 100*d*. Since the destination IP address DI=50.2.3.1 is the assigned address of the first switching device 100*a*, when the fourth switching device 100*d* receives the Ethernet frame P, the Layer 3 transport module 132 of the fourth switching device 100*d* determines that the first switching device 100*a* is the forwarding destination device. The fourth switching device 100*d* then changes the destination MAC address DM of the Ethernet frame P to a MAC address MAC_I10 of the first network switching device 100*a*, and transports the Ethernet frame P from the port I7 to the fifth switching device 100*e* through Layer 3 (FIG. 22).

When the fifth switching device 100*e* receives the Ethernet frame P, since the destination MAC address DM of the Ethernet frame P is not a MAC address assigned to the fifth switching device 100*e* itself, the Layer 2 transport module 133 of the fifth switching device 100*e* looks up the ARP table on the basis of the destination MAC address DM, to determine the forwarding destination. As a result, the fifth switching device 100*e* transports the Ethernet frame P as-is to the first switching device 100*a* through Layer 2 (FIG. 22).

When the first switching device 100*a* receives the Ethernet frame P, since the destination MAC address DM of the Ethernet frame P is a MAC address MAC_I10 assigned to the first switching device 100*a* itself, the Layer 3 transport module 132 of the first switching device 100*a* looks up the routing table on the basis of the destination IP address DI, to determine the forwarding destination. As a result, the first switching device 100*a* changes the destination MAC address DM of the Ethernet frame P to a MAC address MAC_R3 of the external router 500*c*, and transports the Ethernet frame P to the second switching device 100*b* through Layer 3 (FIG. 22).

When the second switching device 100*b* receives the Ethernet frame P, since the destination MAC address DM of the Ethernet frame P is not a MAC address assigned to the second switching device 100*b* itself, the Layer 2 transport module 133 of the second switching device 100*b* looks up the ARP table on the basis of the destination MAC address DM, to determine the forwarding destination. As a result, the second switching device 100*b* transports the Ethernet frame P as-is to the third switching device 100*c* through Layer 2 (FIG. 22). When the third switching device 100*c* then receives the Ethernet frame P, since the destination MAC address DM of the Ethernet frame P is not a MAC address assigned to the third switching device 100*c* itself, the Layer 2 transport module 133 of the third switching device 100*c* looks up in the ARP table on the basis of the destination MAC address DM, to determine the forwarding destination. As a result, the third switching device 100*c* transports the Ethernet frame P as-is to the external router 500*c* through Layer 2 (FIG. 22). In this way, the Ethernet frame P is transported to the external router 500*c*.

As will be understood from the discussion above, the network switching system 1000*a* is able to operate as a single virtual network switching device even in the case of an arrangement of five network switching devices 100 connected in ring. Moreover, the Ethernet frame P discussed above is transported to the external router 500*c* via all five of the network switching devices 100. However, of these transport segments, those taking place through Layer 3 transport (shown by the white arrows) are the segment from the fourth switching device 100*d* to the fifth switching device 100e, and the segment from the first switching device 100*a* to the second switching device 100*b* only; the remaining transport segments, namely, the segment from the fifth switching device 100*e* to the first switching device 100*a*, from the second switching device 100*b* to the third switching device 100*c*, and from the third switching device 100*c* to the external router 500*c*, take place through Layer 2 transport. Consequently, when an Ethernet frame P is routed through the network switching system 1000*a*, the number of hops does not exceed two.

As will be understood from the discussion above, even where a network switching system is composed of several network switching devices 100, the number of hops associated with transport through the network switching system does not exceed two. In this way, the number of hops can be held to two or fewer, even where the network switching system includes many network switching devices 100, as shown in the preceding embodiments and the modification.

Modification 2:

In the embodiments hereinabove, MAC addresses are used as the data link layer addresses, while IP addresses are used as the network layer addresses. This is due to the fact that in the embodiments herein, the network interconnecting the devices uses Ethernet™ as the protocol for the data link layer and IP (Internet Protocol) as the protocol for the network layer. Of course, if different protocols are used for the data link layer and the network layer, the addresses employed in these protocols are used instead.

Modification 3:

In the embodiments hereinabove, associations between MAC addresses of forwarding destination devices and ports designated for delivery of Ethernet frames having those MAC addresses as their destination MAC address are described in the ARP tables 136 as shown in FIG. 9, whereas associations between IP addresses and forwarding destination devices are described in the routing tables 135 as shown in FIG. 14. The information describing these associations is not limited to that in taught in the embodiments. The information pertaining to one or several of these classes may be any information on the basis of which, in cases where the destination MAC address DM of an Ethernet frame received by a network switching device 100 is a MAC address of the network switching device 100 itself, the forwarding destination device is able to be determined appropriately on the basis of destination IP address DI, and the MAC address of the forwarding destination device so determined and the port for delivering Ethernet frames having that MAC address as their destination MAC address may be recognized; or in cases where the destination MAC address DM of an Ethernet frame received by a network switching device 100 is a MAC address of a switching device different from that network switching device 100 itself, the port for delivering Ethernet frames having that MAC address as their destination MAC address can be recognized.

Modification 4:

In the embodiments hereinabove, determination of the assigned address ranges is carried out in such a way that each of the network switching devices 100 has a routing table 135 of substantially the same size. This is premised on the assumption that the size of the memory area for storing the routing table 135 is the same in each of the network switching devices 100. In preferred practice, determination of the assigned address ranges is carried out with reference to the size of the memory area for storing the routing table 135 in each of the network switching devices 100, so that the routing table 135 of each network switching device 100 is accommodated within the available memory area for storing the routing table 135. In this way, the memory capacity of the individual network switching devices 100 may be utilized effectively so that more routing information is able to be kept in the network switching system 1000 as a whole.

Other Modifications:

In the preceding embodiments, the manager 200 is configured as an independent device from the network switching devices 100. However, arrangement of the network switching system is not limited to this arrangement. It is also acceptable, for example, to assign the functions of the manager 200 (the functions accomplished by the ARP information manager 230 and the routing information manager 240) to the controllers 140 of any of the plurality of network switching devices 100 included in the network switching system 1000. This makes the network switching system 1000 configuration simpler.

Some of the arrangements implemented through hardware in the preceding embodiments may instead be implemented through software, and conversely some of the arrangements implemented through software in the preceding embodiments may instead be implemented through hardware.

While the present invention has been shown hereinabove through certain preferred embodiments and modifications, the embodiments set forth herein are provided merely to aid in understanding of the present invention and not for the purpose of limiting the invention. Various modifications and improvements to the present invention can be made without departing from the spirit thereof, and these equivalents shall be considered to lie within the scope of the invention as well.

What is claimed is:

1. A network switching system configured by connecting a plurality of network switching devices, the network switching system operating virtually as a single network switching device wherein each switching device of the plurality of network switching devices comprises:

an address range storage that stores a handling address range pre-assigned as a range of network layer address, said each switching device being responsible to associate between the network layer address within the handling address range and a target transport destination device;

a data receiving unit that receives lower transport layer data including: a destination network layer address which represents a network layer address specifying a destination in the network layer; and a destination lower transport layer identifier which is a lower transport layer identifier specifying a destination in a lower transport layer below the network layer;

an assigned data transport unit that, if received data received by the data receiving unit is the lower transport layer data including the destination lower transport layer identifier specifying said each switching device and if the destination network layer address is an assigned address assigned to said each switching device, generates lower transport layer data including a corresponding identifier as the lower transport layer identifier of the target transport destination device corresponding to the destination network layer address, and transports the generated lower transport layer data on the basis of the corresponding identifier;

an unassigned data transport unit that, if the received data includes the destination lower transport layer identifier specifying said each switching device and if the destination network layer address is an unassigned address not assigned to said each switching device, transports the lower transport layer data to another switching device among the plurality of network switching devices to which the unassigned address is assigned, while setting the lower transport layer identifier of the another switching device to the destination lower transport layer identifier; and a lower transport layer transport unit that, if the received data includes the destination lower transport layer identifier specifying a device different from said each switching device, transports the received data on the basis of the destination lower transport layer identifier.

2. The network switching system in accordance with claim 1 wherein the lower transport layer transport unit is adapted to carry out transport of the lower transport layer data using a data link layer or an intermediate layer between the data link layer and the network layer as the lower transport layer, the data receiving unit receives lower transport layer data including at least one of a destination data link layer address representing a destination in the data link layer and a destination intermediate layer identifier representing a destination in the intermediate layer as the destination transport layer identifier, if the target transport destination device is a transport destination for data in the intermediate layer, the assigned data transport unit generates as the lower transport layer data intermediate layer data including the destination intermediate layer identifier as the corresponding identifier, if the target transport destination device is not a transport destination for data in the intermediate layer, the assigned data transport unit generates as the lower transport layer data link layer data including the destination data link layer address as the corresponding identifier, the lower transport layer transport unit has:
  an intermediate layer transport unit that, if the received data includes the destination intermediate layer identifier, transports the received data on the basis of the destination intermediate layer identifier; and
  a data link layer transport unit that, if the received data does not include the destination intermediate layer identifier, transports the received data on the basis of the destination data link layer address, and if the destination lower transport layer identifier is the intermediate layer identifier, the intermediate layer transport unit generates lower transport layer data not including the intermediate layer identifier.

3. The network switching system in accordance with claim 2 wherein
  the intermediate layer is a label transport layer for transporting the intermediate layer data using a label as the destination intermediate layer identifier, the label being established on the basis of a transport route to the target transport destination device, and
  each of the plurality of network switching devices has label transport layer information associating an adjacent transport destination device situated adjacently to said each switching device itself as the transport destination of the received data and a label established in the intermediate layer data to be transported to the adjacent transport destination, device with an adjacent transport source device situated adjacently to said each switching device as the transport source of the received data and the label of the received data, and
  the intermediate layer transport unit swaps the label of the intermediate layer data by looking up the label transport layer information, and transports the label-swapped intermediate layer data to the adjacent transport destination device.

4. The network switching system in accordance with claim 2 wherein
  the intermediate layer is a tunnel layer that sets up a virtual port virtually connected to the target transport destination device to transport the intermediate layer data via the virtual port,
  each of the plurality of network switching devices has tunnel layer information associating a destination tunnel layer address as the intermediate layer identifier of the target transport destination device in the intermediate layer with the virtual port, the destination tunnel layer address being handled as a network layer address between the virtual port and the target transport destination device,
  the intermediate layer transport unit looks up the tunnel layer information,
  if the destination tunnel layer address is associated with the virtual port set up in said each switching device, the intermediate layer transport unit transports the intermediate layer data to the target transport destination device, and
  if the destination tunnel layer address is associated with the virtual port set up in the device other than itself, the intermediate layer transport unit transporting the intermediate layer data to a device other than itself.

5. A network switching system configured by connecting a plurality of network switching devices, the network switching system operating virtually as a single network switching device, wherein
  each switching device of the plurality of network switching devices comprises:
    a plurality of ports in order to connect to an external device or to a device other than itself among the plurality of network switching devices;
    a data link layer information storage that stores data link layer information associating a data link layer address of a transport destination device with a first corresponding port among the plurality of ports, the transport destination devices including: the device other than itself; a first external device from among external devices connected via a port of said each switching device, and a second external device from among the external devices connected via a port of the device other than itself;
    a network layer information storage that stores first network layer information associating a network layer address with the transport destination device, the transport destination device associated with an assigned address among network layer addresses assigned to said each switching device including the first external device or the second external device, the transport destination device associated with an unassigned address not assigned to said each switching device being the device other than itself to which the unassigned address is assigned;
    a label transport layer information storage that stores label transport layer information associating a label established on the basis of the transport route to the transport destination device with a second corresponding port among the plurality of ports, the label being provided in a label transport layer for the first external device and the device other than itself;
    a receiving unit that receives data via any of the plurality of ports, the received data including: at least one of a destination data link layer address as an address in a link layer and a first destination label as a label of the label transport layer; and a destination network layer address as an address in the network layer;
    a network layer transport unit that, if the destination data link layer address is the data link layer address of said each switching device itself and if the transport destination device associated with the destination data link layer address is not a destination device reliant on the label transport layer, changes the destination data link layer address to the data link layer address of the transport destination device associated with the destination network layer address and transports the received data from the first corresponding port associated with the changed destination data link layer address by using the data link layer information and the first network layer information;

a label transport layer ingress transport unit that, if the destination data link layer address is the data link layer address of said each switching device and if the transport destination device associated with the destination data link layer address is a destination reliant in the label transport layer, appends as the first destination label a label of the transport destination device associated with the destination network layer address by using the first network layer information, and transports the received data from the second corresponding port associated with the first destination label by using the label transport layer information;

a data link layer transport unit that, if the destination data link layer address is the data link layer address of the transport destination device, transports the received data from the first corresponding port associated with the destination data link layer address by using the data link layer information;

a label transport layer intermediate transport unit that, if the first destination label is a label of the label transport layer corresponding to the transport destination device, changes the label of the received data to the second destination label associated with the first destination label and transports the received data from the second corresponding port associated with the second destination label by using the label transport layer information; and a label transport layer egress transport unit that, if the first destination label is a label specifying removal of the label, removes the label from the received data, and changes the destination data link layer address to a data link layer address of the transport destination device associated with the destination network layer address and transports the received data from the first corresponding port associated with the changed destination data link layer address by using the first network layer information.

6. The network switching system in accordance with claim 5 wherein each of the plurality of network switching devices further comprises:
a first learning unit that learns first partial information representing a part of the data link layer information relating to the data link layer address of the transport destination device situated adjacent to said each switching device, and the network switching system further includes:
a first acquiring unit that acquires the first partial information from each of the plurality of network switching devices; and
a first setup unit that sets up second partial information representing a part of the first partial information relating to data link layer addresses of transport destination devices not adjacent to said each switching device, the information being set up in each of the plurality of network switching devices on the basis of the acquired first partial information.

7. The network switching system in accordance with claim 5 wherein in the event of a change in an adjacency relationship with the first external device occurring in any of the plurality of network switching devices, the first learning unit of the network switching device in which the change occurred re-learns the first partial information, the first acquiring unit re-acquires the first partial information from the network switching device in which the change occurred, and the first setup unit re-sets up the second partial information in each of the plurality of network switching devices.

8. The network switching system in accordance with claim 5 wherein each of the plurality of network switching devices further includes:
second learning unit that learns routing information retained in the first external device from the first external device, and the network switching system further comprises:
second acquiring unit that acquires the routing information from each of the plurality of network switching devices; and
second setup unit that sets up the first network layer information in each of the plurality of network switching devices on the basis of the acquired routing information.

9. The network switching system in accordance with claim 8 wherein the second setup unit has:
a first creation unit that generates second network layer information associating network layer addresses with the first external device or the second external device on the basis of the acquired routing information;
a division unit that divides the network layer addresses into address ranges equal in number to the plurality of network switching devices and designates the network layer addresses included in the respective address ranges as the respective assigned addresses of the plurality of network switching devices; and
a second creation unit that generates first network layer information for respective setup in the plurality of network switching devices on the basis of the second network layer information and the results of the division.

10. The network switching system in accordance with claim 9 wherein the division unit determines the address ranges such that the first network layer information is generated according to a capacity of the respective memories of the plurality of network switching devices.

11. The network switching system in accordance with claim 8 wherein in the event of a change in an adjacency relationship with the first external device occurring in any of the plurality of network switching devices, the second learning unit of the network switching device in which the change occurred re-learns the routing information, the second acquiring unit re-acquire the routing information from the network switching device in which the change occurred, and the second setup unit re-sets up the first network layer information in each of the plurality of network switching devices.

12. A network switching system configured by connecting a plurality of network switching devices, the network switching system operating virtually as a single network switching device, wherein each switching device of the plurality of network switching devices comprises:
a plurality of ports in order to connect to an external device or to a device other than itself among the plurality of network switching devices;
a data link layer information storage that stores data link layer information associating a data link layer address of a transport destination device with a corresponding port among the plurality of ports, the transport destination devices including: the device other than itself; a first external device from among external devices connected via a port of said each switching device, and a second external device from among the external devices connected via a port of the device other than itself;

a network layer information storage that stores first network layer information associating a network layer address with the transport destination device, the transport destination device associated with an assigned address among network layer address assigned to said each switching device including the first external device or the second external device, the transport destination device associated with an unassigned address not assigned to said each switching device being the device other than itself to which the unassigned address is assigned;

a tunnel layer information storage that stores tunnel layer information associating with a virtual port provided independently from the plurality of ports a destination tunnel layer address which indicates the tunnel layer address of a tunnel destination external device connected via the virtual port and a transmission source tunnel layer address which is the tunnel layer address of a device of itself or devices other than itself having the virtual port, the tunnel layer addresses being handled as network layer addresses between the virtual port and the tunnel destination external device;

a receiving unit that receives data via any of the plurality of ports, the received data including: at least one of a destination data link layer address as an address in a data link layer and a destination tunnel layer address; and a destination network layer address as an address in the network layer;

a network layer transport unit that, if the destination data link layer address is the data link layer address of said each switching device and if the transport destination device associated with the destination data link layer address is not a destination device which routes through the virtual port, changes the destination data link layer address to the data link layer address of the transport destination device associated with the destination network layer address and transports the received data from the corresponding port associated with the changed destination data link layer address by using the data link layer information and the first network layer information;

a tunnel transport layer ingress transport unit that, if the destination data link layer address is the data link layer address of said each switching device and if the transport destination device associated with the destination data link layer address is the tunnel destination external device, appends: the destination tunnel layer address associated with the virtual port; and the transmission source tunnel layer address to the received data by using the first network layer information and the tunnel layer information, and transports the received data from the corresponding port associated with the destination tunnel layer address by using the first network layer information in which the destination tunnel layer address is designated as the destination network layer address;

a data link layer transport unit that, if the data link layer address is the data link layer address of the transport destination device, transports the received data from the first corresponding port associated with the destination data link layer address by using the data link layer information; and a tunnel layer egress transport unit that, if the destination network layer address is the tunnel layer address of the device itself, removes the destination tunnel layer address and the transmission source tunnel layer address from the received data, and changes the destination data link layer address to the data link layer address of the transport destination device associated with the destination network layer address and transports the received data from the corresponding port associated with the changed destination data link layer address by using the first network layer information.

13. The network switching system in accordance with claim 12 wherein each of the plurality of network switching devices further comprises:
a first learning unit that learns first partial information representing a part of the data link layer information relating to the data link layer address of the transport destination device situated adjacent to said each switching device, and the network switching system further includes:
a first acquiring unit that acquires the first partial information from each of the plurality of network switching devices; and
a first setup unit that sets up second partial information representing a part of the first partial information relating to data link layer addresses of transport destination devices not adjacent to said each switching device, the information being set up in each of the plurality of network switching devices on the basis of the acquired first partial information.

14. The network switching system in accordance with claim 12 wherein in the event of a change in an adjacency relationship with the first external device occurring in any of the plurality of network switching devices, the first learning unit of the network switching device in which the change occurred re-learns the first partial information, the first acquiring unit re-acquires the first partial information from the network switching device in which the change occurred, and the first setup unit re-sets up the second partial information in each of the plurality of network switching devices.

15. The network switching system in accordance with claim 12 wherein each of the plurality of network switching devices further includes:
second learning unit that learns routing information retained in the first external device from the first external device, and the network switching system further comprises:
second acquiring unit that acquires the routing information from each of the plurality of network switching devices; and
second setup unit that sets up the first network layer information in each of the plurality of network switching devices on the basis of the acquired routing information.

16. The network switching system in accordance with claim 15 wherein the second setup unit has:
- a first creation unit that generates second network layer information associating network layer addresses with the first external device or the second external device on the basis of the acquired routing information;
- a division unit that divides the network layer addresses into address ranges equal in number to the plurality of network switching devices and designates the network layer addresses included in the respective address ranges as the respective assigned addresses of the plurality of network switching devices; and
- a second creation unit that generates first network layer information for respective setup in the plurality of network switching devices on the basis of the second network layer information and the results of the division.

17. The network switching system in accordance with claim 16 wherein the division unit determines the address ranges such that the first network layer information is generated according to a capacity of the respective memories of the plurality of network switching devices.

18. The network switching system in accordance with claim 15 wherein in the event of a change in an adjacency relationship with the first external device occurring in any of the plurality of network switching devices, the second learning unit of the network switching device in which the change occurred re-learns the routing information, the second acquiring unit re-acquire the routing information from the network switching device in which the change occurred, and the second setup unit re-sets up the first network layer information in each of the plurality of network switching devices.

* * * * *

UNITED STATES PATENT AND TRADEMARK OFFICE
CERTIFICATE OF CORRECTION

PATENT NO. : 7,817,637 B2
APPLICATION NO. : 12/179603
DATED : October 19, 2010
INVENTOR(S) : Kitani et al.

It is certified that error appears in the above-identified patent and that said Letters Patent is hereby corrected as shown below:

Title Page Item (73), should read as follows:

(73) Assignee: ALAXALA Networks Corporation,
Kanagawa (JP)

Signed and Sealed this
Fourteenth Day of June, 2011

David J. Kappos
*Director of the United States Patent and Trademark Office*